United States Patent
Helpingstine et al.

(10) Patent No.: US 11,064,102 B1
(45) Date of Patent: Jul. 13, 2021

(54) VENUE OPERATED CAMERA SYSTEM FOR AUTOMATED CAPTURE OF IMAGES

(71) Applicant: Ikorongo Technology, LLC, Chapel Hill, NC (US)

(72) Inventors: Mike Helpingstine, Cary, NC (US); Hugh Blake Svendsen, Chapel Hill, NC (US)

(73) Assignee: Ikorongo Technology, LLC, Chapel Hill, NC (US)

( * ) Notice: Subject to any disclaimer, the term of this patent is extended or adjusted under 35 U.S.C. 154(b) by 11 days.

(21) Appl. No.: 16/248,930

(22) Filed: Jan. 16, 2019

Related U.S. Application Data

(60) Provisional application No. 62/621,862, filed on Jan. 25, 2018.

(51) Int. Cl.
| | |
|---|---|
| *H04N 5/232* | (2006.01) |
| *H04W 4/021* | (2018.01) |
| *H04W 4/21* | (2018.01) |
| *H04W 4/42* | (2018.01) |
| *H04W 4/024* | (2018.01) |

(52) U.S. Cl.
CPC ........ *H04N 5/23206* (2013.01); *H04W 4/022* (2013.01); *H04W 4/024* (2018.02); *H04W 4/21* (2018.02); *H04W 4/42* (2018.02)

(58) Field of Classification Search
CPC .... H04N 5/23206; H04W 4/024; H04W 4/42; H04W 4/022; H04W 4/21
See application file for complete search history.

(56) References Cited

U.S. PATENT DOCUMENTS

| | | |
|---|---|---|
| 6,526,158 B1 | 2/2003 | Goldberg |
| 6,591,068 B1 | 7/2003 | Dietz |
| 6,819,783 B2 | 11/2004 | Goldberg et al. |
| 6,919,920 B2 | 7/2005 | Squilla et al. |
| 7,035,440 B2 | 4/2006 | Kaku |
| 7,068,309 B2 | 6/2006 | Toyama et al. |
| 7,107,605 B2 | 9/2006 | Janik |
| 7,266,563 B2 | 9/2007 | Morris et al. |
| 7,376,696 B2 | 5/2008 | Bell et al. |

(Continued)

OTHER PUBLICATIONS

Selfie Station, "https://selfiestation.com", 2018, 4 pages.

(Continued)

*Primary Examiner* — Yogesh K Aggarwal

(57) ABSTRACT

Methods, devices, computer readable medium, and systems are described for capturing images at venues. Venues are organized around one or more shotspots. Shotspots are geographic locations which may have one or more subspots and one or more venue operated camera devices. Subspots identify positions to be occupied by subjects within a shotspot. Shotspots are installed, registered, and operated by venue operators. Images are captured based on triggers which may include one or more conditions under which images will be stored. Conditions may also include negative limitations. Users wishing to use a shotspot do so through a mobile device. Interacting through the mobile device, a user may discover, receive directions to, navigate to, and arrange sessions during which they may use a shotspot. Users may also receive sample images, define triggers, initiate triggers, preview framing, and receive images through the mobile application.

34 Claims, 23 Drawing Sheets

(56) References Cited

U.S. PATENT DOCUMENTS

| | | | |
|---|---|---|---|
| 7,426,532 B2 | 9/2008 | Bell et al. | |
| 7,472,134 B2 | 12/2008 | Kaku | |
| 7,561,723 B2 | 7/2009 | Goldberg et al. | |
| 7,730,130 B2 | 6/2010 | Issa | |
| 7,739,304 B2 | 6/2010 | Naaman et al. | |
| 7,881,968 B2 | 2/2011 | David | |
| 7,924,323 B2 | 4/2011 | Walker et al. | |
| 7,933,972 B1 | 4/2011 | Issa et al. | |
| 7,965,908 B2 | 6/2011 | Hayashi | |
| 7,966,223 B2 | 6/2011 | David | |
| 8,144,944 B2 | 3/2012 | Ishii | |
| 8,204,437 B1 | 6/2012 | Rothschild | |
| 8,237,806 B2 | 8/2012 | Tanaka et al. | |
| 8,260,674 B2 | 9/2012 | David | |
| 8,264,529 B2 | 9/2012 | Goulart et al. | |
| 8,332,281 B2 | 12/2012 | Smith et al. | |
| 8,437,797 B2 | 5/2013 | Rothschild | |
| 8,594,722 B2 | 11/2013 | Rothschild | |
| 8,818,101 B1 * | 8/2014 | Lim | G06K 9/6203 382/190 |
| 9,318,129 B2 | 4/2016 | Vasilieff et al. | |
| 10,334,158 B2 | 6/2019 | Gove | |
| 2002/0126150 A1 | 9/2002 | Parry | |
| 2003/0063770 A1 | 4/2003 | Svendsen et al. | |
| 2003/0063771 A1 | 4/2003 | Morris et al. | |
| 2003/0118216 A1 | 6/2003 | Goldberg | |
| 2003/0161499 A1 | 8/2003 | Svendsen et al. | |
| 2004/0044723 A1 | 3/2004 | Bell et al. | |
| 2004/0044724 A1 | 3/2004 | Bell et al. | |
| 2004/0044725 A1 | 3/2004 | Bell et al. | |
| 2004/0201683 A1 | 10/2004 | Murashita et al. | |
| 2005/0162711 A1 | 7/2005 | Wu | |
| 2006/0161867 A1 | 7/2006 | Drucker et al. | |
| 2006/0170669 A1 | 8/2006 | Walker et al. | |
| 2006/0242238 A1 | 10/2006 | Issa | |
| 2008/0189766 A1 | 8/2008 | Bell et al. | |
| 2009/0063995 A1 | 3/2009 | Baron et al. | |
| 2010/0080464 A1 | 4/2010 | Sawai et al. | |
| 2010/0150407 A1 | 6/2010 | Cheswick | |
| 2010/0191728 A1 | 7/2010 | Reilly et al. | |
| 2011/0182485 A1 | 7/2011 | Shochat et al. | |
| 2011/0211736 A1 | 9/2011 | Krupka et al. | |
| 2011/0211737 A1 * | 9/2011 | Krupka | G06F 16/58 382/118 |
| 2012/0027293 A1 * | 2/2012 | Cok | G06F 16/4393 382/164 |
| 2012/0265758 A1 | 10/2012 | Han et al. | |
| 2013/0035114 A1 | 2/2013 | Holden et al. | |
| 2013/0050407 A1 * | 2/2013 | Brinda | H04N 5/232945 348/38 |
| 2013/0093897 A1 * | 4/2013 | Fan | H04N 5/23229 348/159 |
| 2013/0290188 A1 | 10/2013 | Olliphant | |
| 2015/0346932 A1 * | 12/2015 | Nuthulapati | G06F 3/017 715/704 |
| 2015/0347827 A1 | 12/2015 | Dickinson et al. | |
| 2017/0324893 A1 | 11/2017 | Matsuda | |
| 2018/0293752 A1 * | 10/2018 | Ninan | G06F 3/011 |
| 2019/0208116 A1 * | 7/2019 | Paul | H04N 5/23222 |

OTHER PUBLICATIONS

Shi Yu, "GestureCam: A Smart Camera for Gesture Recognition and Gesture-Controlled Web Navigation", National ICT Australia, Sydney, Australia, 2006, 6 pages.

* cited by examiner

SYSTEM DIAGRAM

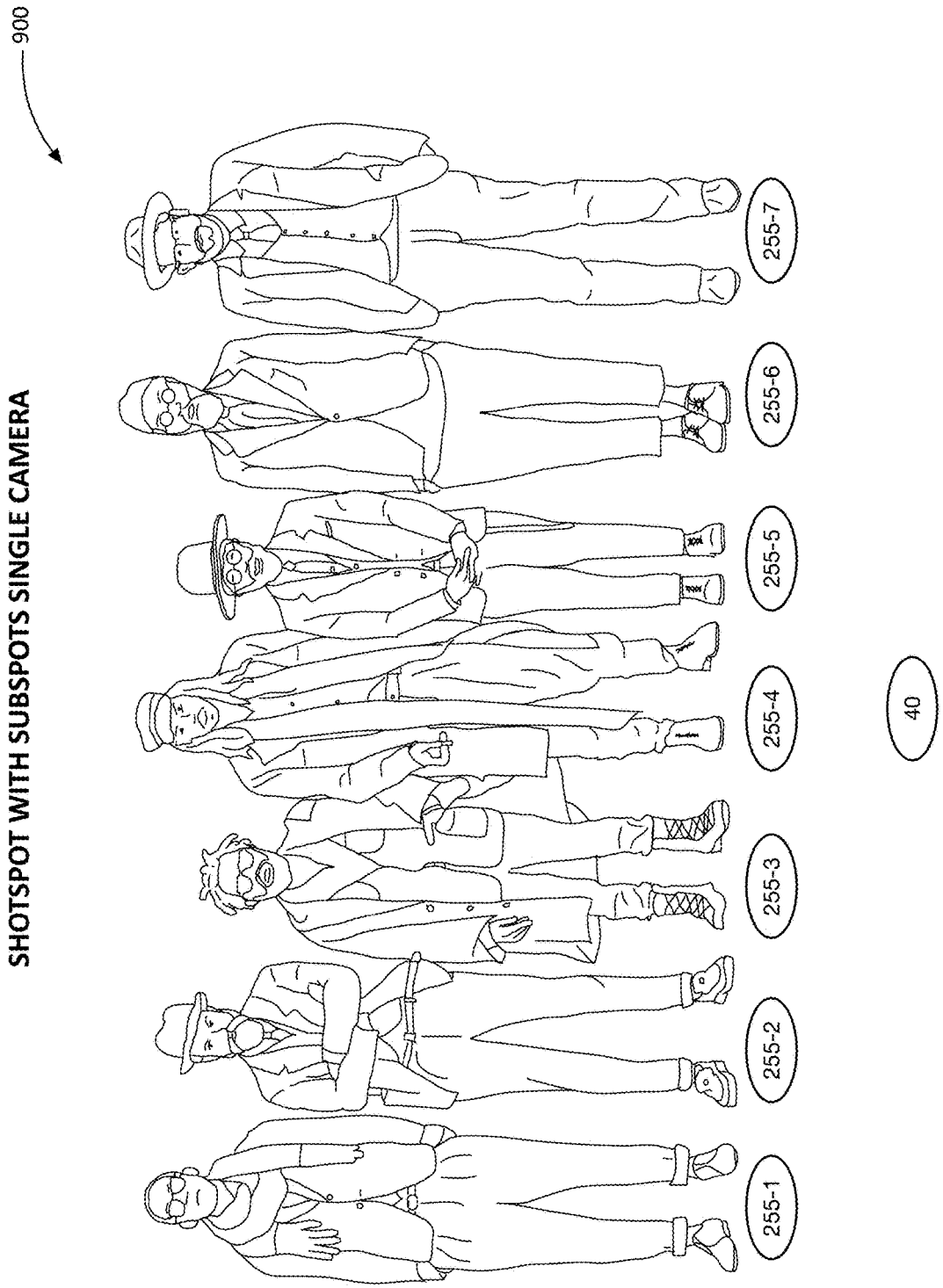

VENUE OPERATED CAMERA SYSTEM FOR AUTOMATED CAPTURE OF IMAGES

TECHNICAL FIELD

The present disclosure relates to a system for capturing images at venues. Venues are organized around shotspots which may have one or more subspots and one or more venue operated camera devices. Images are captured based on triggers which may include one or more conditions under which images will be stored. Conditions may also include negative limitations. Conditions may include a participant being located at a certain geographic location at a specified time oriented in a specified direction with a specified facial emotion.

RELATED CASES

This application claims the benefit of U.S. Provisional Patent Application No. 62/621,862 filed on Jan. 25, 2018, the disclosure of which is incorporated herein by reference in its entirety.

BACKGROUND OF DISCLOSURE

For decades the general public has taken photographs of themselves at the famous and popular locations they visit. Today's smartphones, equipped with high-quality cameras, have helped to improve the quality and efficiency of this process. SLR cameras offer even higher quality. Further, the miniaturization of cameras and lenses along with dramatic improvements in image editing and digital filters have served to greatly improve the quality of modern photography. Today's captured images are instantly shared on social media by way of the internet and cloud computing. These innovations have nearly perfected the process of taking and sharing photos, save for the most important aspect of "framing" the shot.

SUMMARY OF THE DISCLOSURE

Capturing the perfect photo requires expert positioning of both the subjects and the camera under optimal lighting conditions. The present disclosure teaches how to use the latest technologies to enable the general public to effortlessly have incredible photographs taken of themselves while at famous and popular places without needing any equipment, subscription, or service. It also teaches the use of a companion mobile smartphone app used to inform users of this service availability, and to guide the user towards setting up and taking the best shot.

Getting that perfect selfie or group photograph when visiting famous landmarks such as buildings, parks, and monuments or when visiting a popular business or attraction, can be challenging. We either sacrifice a member of the group to take the photo, or we enlist the help of a server, waiter, or random person. In some settings handing your phone or camera over to a stranger is not the best idea.

Regardless of who takes the photograph and how good their equipment is, the best images are generally captured by high-end cameras, with fixed tripod or similar stabilization hardware and operated by professional experienced photographers. Many factors and variables must be considered prior to taking the shot.

Often, if not always, there is a crowd of other visitors in our way, wanting to take a photo in the same place. We've all ducked low as we walk in between that family at graduation trying to get a decent photo of their student with grandma while holding the rest of us up. Professionals leave nothing to chance, using step ladders to elevate their platform. From a slightly higher vantage point they are able to occlude the crowd from their shots while also making their subjects appear slimmer, which occurs when taking downward angled shots.

The one problem, however, is that virtually nobody brings a photographer with them on vacation, or to graduation, etc. It's simply too expensive and unnecessary. The equipment necessary to take high quality photographs is affordable, just not the labor.

Using the system described herein to replace the professional photographer will solve this problem and greatly improve the photographs we capture. Further, removing the requirement of the public to have their own equipment or software will open the system up to more mobile devices. Furthermore, a mobile app is offered to augment the system and provide additional features and functionality.

It is a goal of the present disclosure to improve the technology employed by the various components and devices comprising the system, thereby improving the functionality of the composite system. These improvements in technology are expected to improve the functionality available to users of the system as well, indeed it is a primary motivation behind improving the technology. Improvements to the components and devices comprising the system and improvements in functionality available to users should not be considered mutually exclusive.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a server device comprising: a network interface operable to: couple the server device to a mobile device and a venue operated camera device over a network; and a processor and memory, associated with the server device, operable to: send, to the mobile device, venue information identifying one or more shotspots; receive, from the mobile device, a designated shotspot of the one or more shotspots; receive, from the mobile device, trigger information identifying one or more conditions; determine trigger status; send, to the mobile device, the trigger status; and send, to the mobile device, an image captured based on the trigger information.

Implementations may include one or more of the following features. The venue may be one of more of: a park, a cruise ship, a business, a sports venue, a monument, a music venue, and any arbitrary area. The server device in sending venue information, may be further operable to: receive a current location of the mobile device; and send, based on the current location, the venue information. The server device in sending venue information, may be further operable to: receive a first geographic location, the first geographic location identifying a geographic location of a shotspot associated with the venue operated image capture device; receive a second geographic location, the second geographic location identifying a geographic location of the mobile device associated with a user account; performing a comparison of the first geographic location and the second geographic location; and based on the comparison, send, to the to the mobile device, the venue information. The first geographic location and second geographic location may be expressed in GPS coordinates. The comparison may be performed to determine if the shotspot and the mobile device associated with the user account are in proximity. The shotspot and the mobile device associated with the user account may be in proximity if distance between the venue operated image capture device and the mobile device associated with the user account is less than one of 3 feet, 5 feet, 10 feet, 25 feet, 100 feet, 250 feet, 500 feet, 1000 feet, and one mile. The server device may be further operable to: send, to the mobile device, shotspot information for the designated shotspot identifying: one or more subspots, one or more cameras directed to the one or more subspots. The server device may be further operable to: send a navigation aid, wherein the navigation aid is one or more of: a map, an audio clip, a video clip, and GPS coordinates. The server device may be further operable to: send a map, wherein the map includes one or more of: a geographic location of the venue, a geographic location of the mobile device, a geographic location of the venue operated image capture device, and a geographic location of the designated shotspot. The server device may be further operable to: send, to the mobile device, a navigational aid enabling a user of the mobile device to arrive at the designated shotspot; and send, to the mobile device, a sample image taken at the designated shotspot wherein an other user appears in the sample image. The server device may be further operable to: create a session, the session identifying a time period during which the designated shotspot is or was reserved for the mobile device. The server device may be further operable to: group images captured during the session with the session. The session may be scheduled in advance of the mobile device arriving at the designated shotspot. The session may be scheduled in response to the mobile device arriving at an available designated shotspot. The server device may be operable to: receive information identifying a subject face of a user associated with the mobile device. The server device may be further operable to: link existing images in which the subject face appears with a user account associated with the user of the mobile device. The server device may be further operable to: link existing sessions in which the user corresponding to the subject face participated. The server device may be further operable to: configure all venue operated camera devices to auto-capture images in which the subject face appears; and send, to the mobile device associated with the user associated with the user, the auto-captured images. The trigger information may direct the venue operated camera device to capture the image: based on scenes received at venue operated camera device, immediately upon receipt of the trigger information, after a timer countdown, based upon a hand gesture of a user, and based on audio information, based on a presence of one or more users based on a detection of one or more subject faces, based on the presence of one or more users based on tracking information, and based on all users expressing a same emotion. The server device, in determining trigger status, may be further operable to: receive, from each of one or more venue operated camera devices associated with the designated shotspot, trigger status, the trigger status identifying a status of each condition associated with the trigger; and route, to one or more devices associated with one or more subspots associated with the designated shotspot, a corresponding trigger status for one subspot of the one or more subspots. The server device, in sending trigger status, may be further operable to: send preview information. The preview information may be one or more of: a video-feed from the venue operated camera device, an image-feed from the venue operated camera device, and an image from the venue operated camera device. The image may be one or more of: a thumbnail image, a watermarked image, a RAW image, an encoded image, and a URL for the image. The image may be stored at the server device. The mobile device may be one of: a mobile phone, a tablet, and a portable computer. The venue operated camera device may be one of: mounted on a pole; hung from a wire; mounted in ground; mounted at ground level; and mounted on a building. The venue may be a moveable venue, the shotspots are stationary in reference to the moveable venue, and geographic coordinates of the shotspots, subspots, and venue operated cameras are expressed relative to the moveable venue geographical position. The venue may be one of more of: an automobile, a cruise ship, and an airplane. The server device may be further operable to: receive, from the mobile device, tracking information, the mobile device associated with a user account, the user account associated with the user; determine, based on the tracking information, that the mobile device is at the designated shotspot; and send, based on the determination, a command to the venue operated camera device to capture the image of the user associated with the mobile device. The server device may be further operable to: receive, from the mobile device, subject face information identifying a user associated with a user account, the user account associated with the mobile device; send, to the venue operated camera device, the subject face information; and receive, from the venue operated camera device, the image captured by the venue operated camera device wherein a subject face identified by the subject face information appears. The venue operated camera device may be one of a plurality of venue operated camera devices associated with the designated shotspot. Implementations of the described techniques may include hardware, a method or process, or computer software on a computer-accessible medium.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 9 illustrates an exemplary shotspot with nine subspots;

Figure 12:
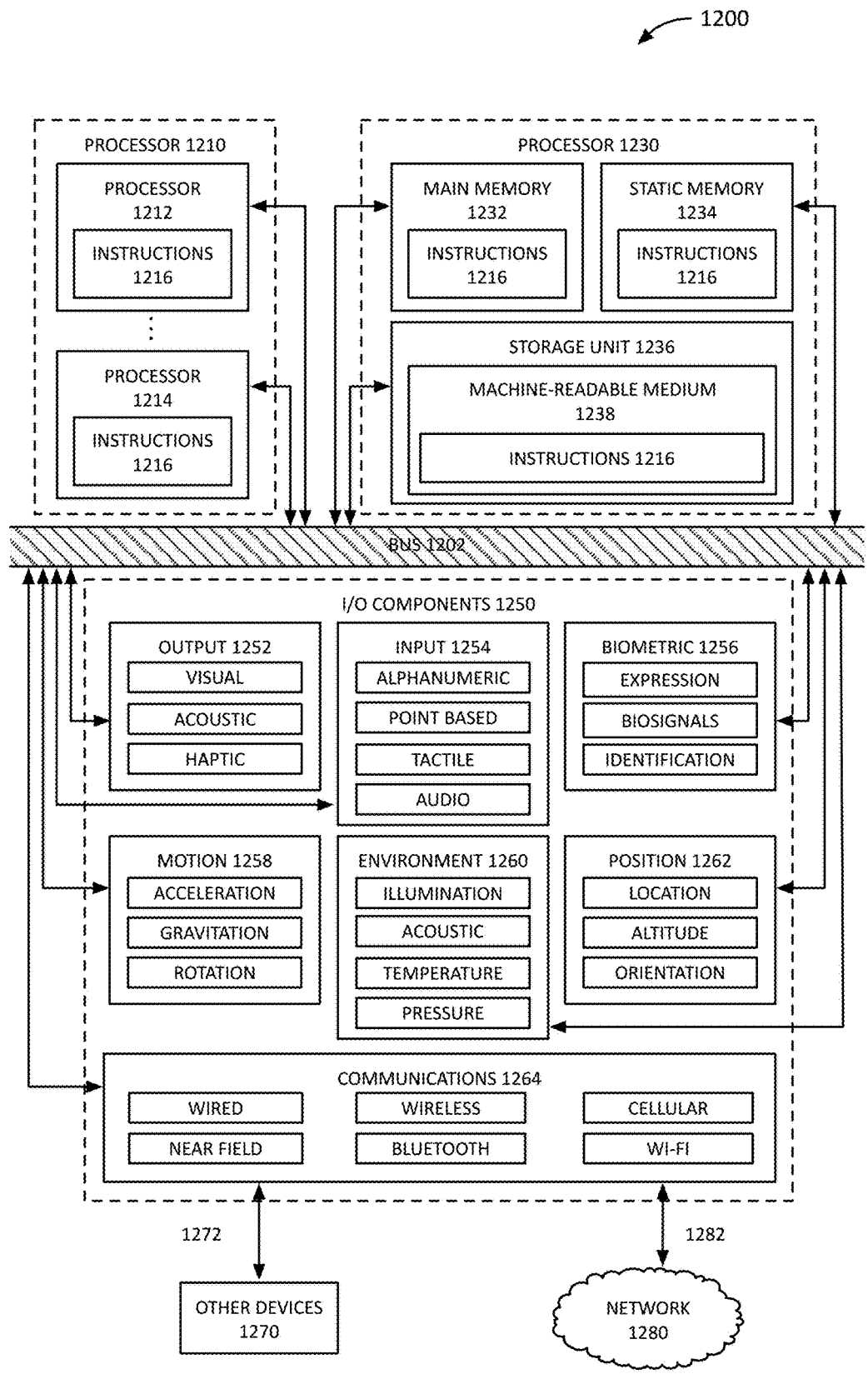
Figure 13:
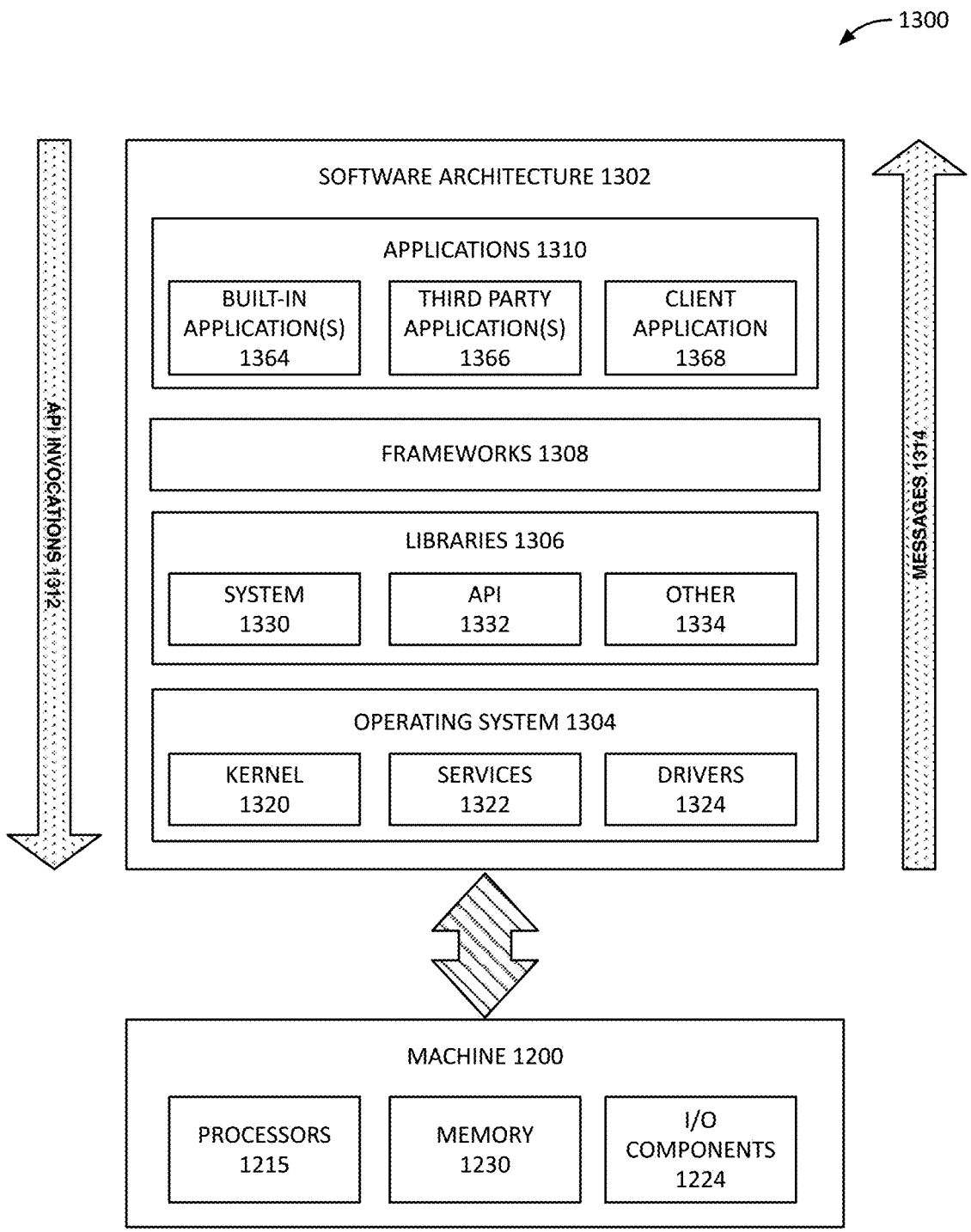
Figure 14:
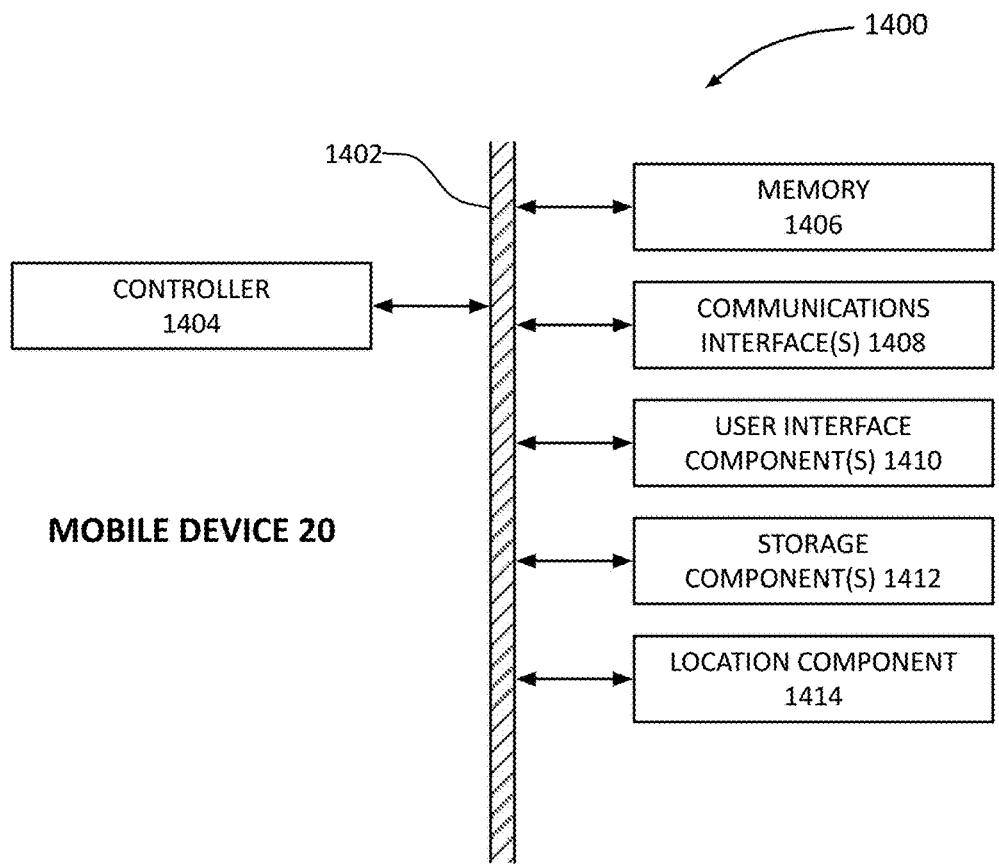
Figure 15:
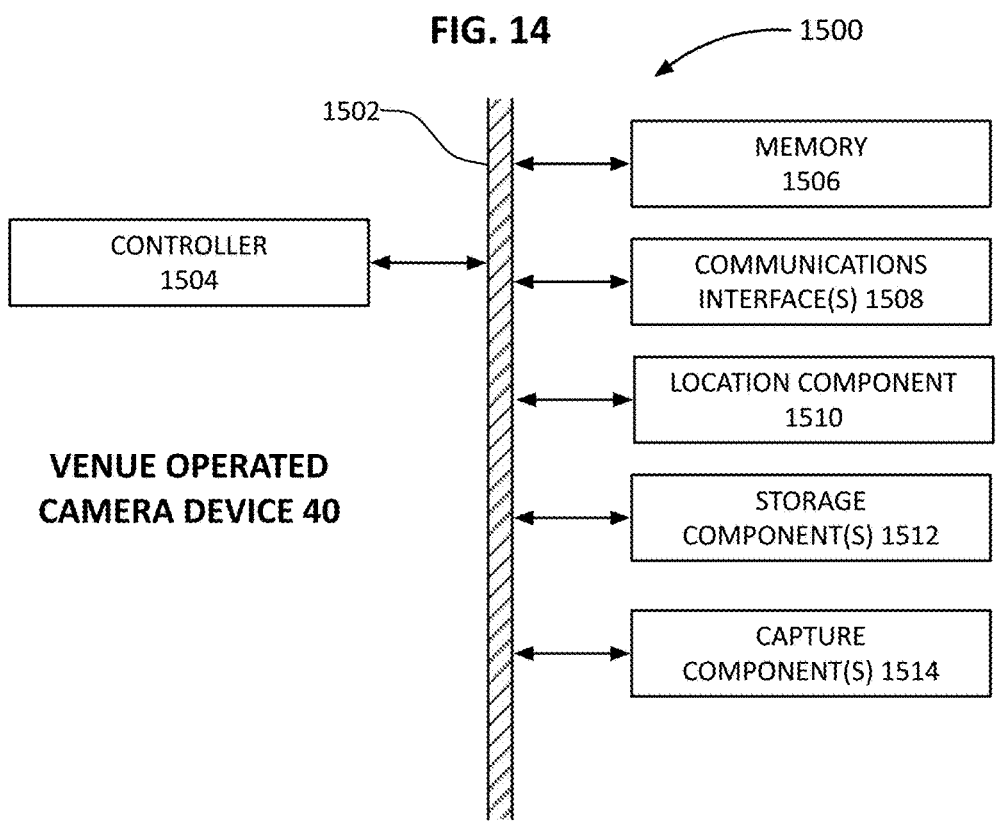

FIG. 12 graphically illustrates a block diagram of the hardware elements comprising a mobile device;

FIG. 13 graphically illustrates a block diagram of an exemplary software architecture of a mobile device;

FIG. 14 is an exemplary block diagram for an exemplary mobile device;

FIG. 15 is an exemplary block diagram for an exemplary venue operated camera device;

and

Figure 16:
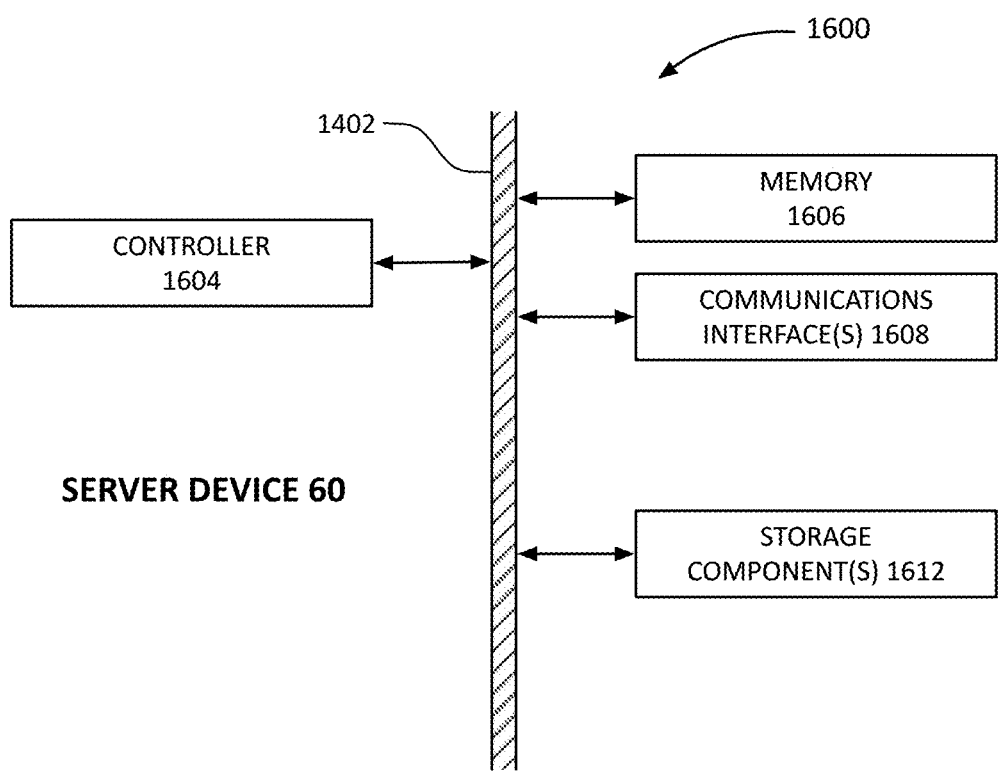

FIG. 16 is an exemplary block diagram for an exemplary server device.

DETAILED DESCRIPTION

The present disclosure describes a picture taking system comprised of venues, cameras, shotspots, subspots, mobile devices, and servers. In general, the cameras are permanently mounted to poles, walls, ceilings or rooftops.

A shotspot-ready camera unit comprises a camera, lens, mount, power supply, Internet access, software, and memory. The venue operator establishes the best shot possible for the location. He marks the spot where the subjects are to stand with a marker (many types possible). The venue operator installs the camera in a location a few feet to a few hundred meters away (depending on the environment). ShotSpot cameras are configured for any application including indoor mounting (e.g. inside of an office looking across the street), or outdoor models (with protective housing) and with any lens configuration necessary (prime or zoom etc.).

Once installed, the camera is ready to take photographs. The camera is awakened when a subject arrives at a shotspot location. In some embodiments, the subject waves at the camera when he is ready for his picture to be taken. The camera may flash a light to indicate it is about to take the photograph. It may then capture any number of images over a specified period of time (usually a couple seconds). The camera software may determines the best images and discards the rest. The selected images are then uploaded to the ShotSpot servers for retrieval and distribution.

Some cameras are installed higher up as to avoid pedestrians and vehicles from interfering in a shot. Having the cameras installed higher up comes with an added benefit of "slimming" those captured in the photographs. Other cameras are installed low to the group to capture larger objects in the background.

The present invention includes a central server system with controller and memory, server software for image processing and data manipulation, mobile profile and account databases, data storage, and a communications controller for coupling the server to the remotely located cameras.

For some venues there may be one or more camera installed. Having multiple cameras allows for variety in the backgrounds captured, accounting for the time of day (to use the best camera based on the suns position when used) and using an alternate camera when others are obscured by crowds. A camera can be constructed in many ways, it is envisioned that a complete system would be similar in size and shape to a typical security video camera today (e.g. a large can of soup). The camera would likely utilize an oversized canopy or hood to better protect the glass cover in front of the actual lens from the elements. The camera may be mounted far away from the subjects and high up enough to be able to look down on the subjects and capture them without interference from other people, or delivery trucks, and the like. In some configurations the camera will be nearly invisible to the public, while in other scenarios (ex. DisneyWorld) they might be highly visible and mounted on short poles or towers.

In some embodiments, the ShotSpot locations where the subjects stand can be physically marked to identify the exact spot to stand, or if using a mobile app, an augmented reality feature may be used to identify where the shotspot is and where to look at the camera. Otherwise the shotspot marker should indicate the direction and height of the camera to help the subject find it quickly. This is especially helpful when the camera is using a telephoto lens from some distance and is nearly invisible.

A subject need not have any device or prerequisite action to use the system. A person can stumble upon a shotspot, stand thereon, wave at an associated camera, wait for the flash of light, then pose momentarily for their photo to be taken. Later, at any time in the future, the person can go to the ShotSpot website and locate his photograph based upon (a) location (b) camera used and (c) time of day. Any number of compensation methods may be employed with this scenario (sponsored, pay per image, etc.)

In some embodiments, the shotspot may issue a session identifier to the initiator and/or participants that allow access to the images at a later time. In some embodiments, access is not allowed without the session identifier, thereby preventing unauthorized access to the images.

In some embodiments, the shotspot may send thumbnails of the images captured whereby the thumbnails have embedded within access credentials allowing for access to the images, thereby preventing the participants from having to enter in a session identifier. Forwarding thumbnails to other devices enables access to just the images represented by the thumbnails.

A subject might have taken dozens of shots at dozens of venues while on vacation. Retrieving the photos would be time-consuming. So, at any time he can create an account at the server device 60 and submit his portrait for facial recognition. Once an account is created for the user, captured images in which their face appears are automatically linked to their account for easy retrieval.

Figure 1:
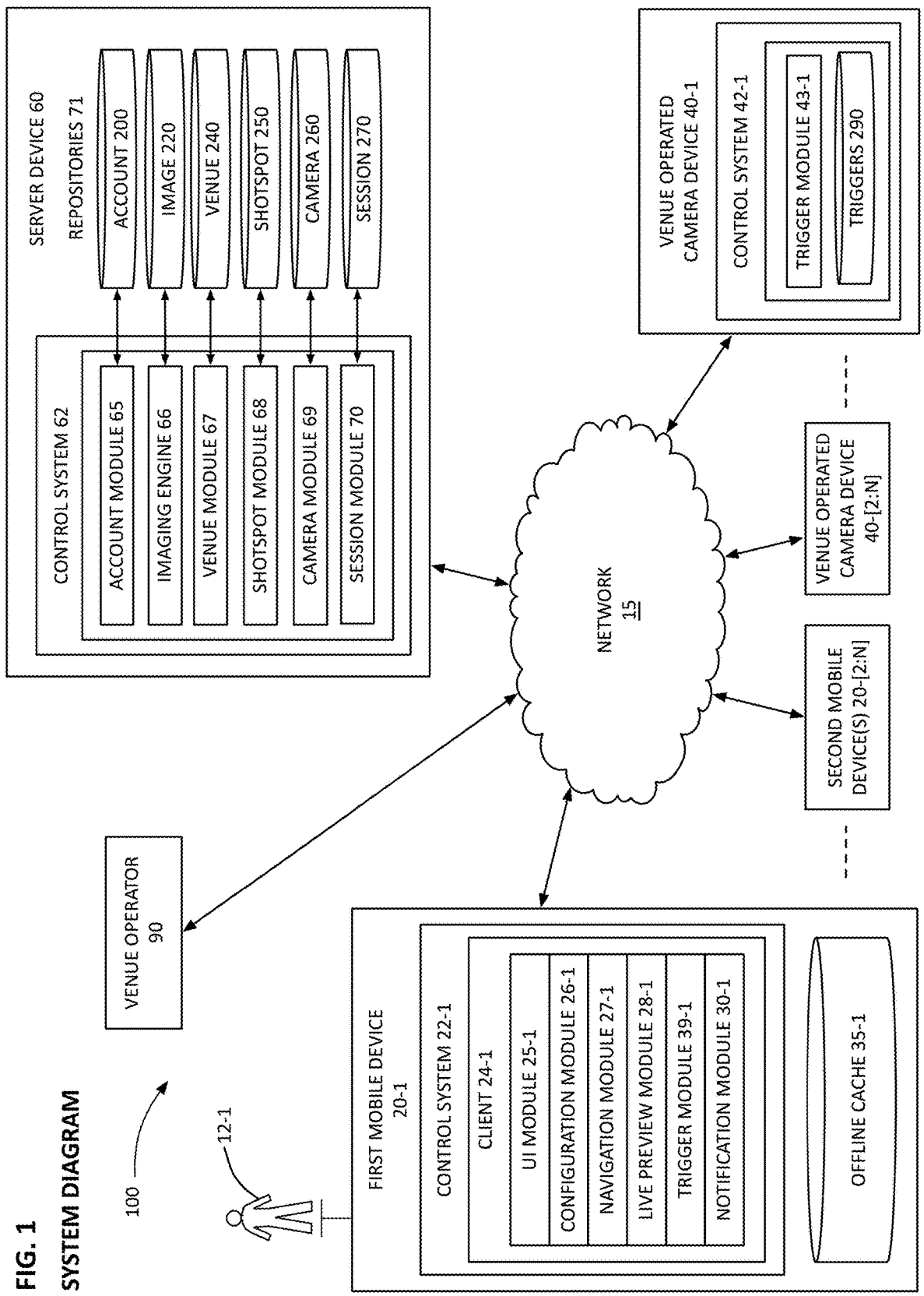
FIG. 1 illustrates an exemplary system diagram for the shotspot system.

Referring now to the drawings, FIG. 1 illustrates an exemplary system diagram 100 for the shotspot system. The system is comprised of a server device 60, one or more mobile devices 20, and one or more venue operated camera devices 40, all connected through a network 15.

The mobile device 20 is comprised of a control system 22 and a client 24. The client is comprised of a UI module 25, configuration module 26, navigation module 27, live preview module 28, trigger module 39, and a notification module 30. The UI module 25 operates to receive user inputs through the various input 1254 interfaces, and to provide feedback through the various output 1252 interfaces. The configuration module 26 operates to initialize the client according to various preferences specified by the client vendor and the user 12. The navigation module 27 facilties the navigation of the user 12 to venues 241 and shotspots 251 based on maps 245 257 and navigational aids 246 258. The preview module 28 facilties the presentation of image data being captured by a venue operated camera device 40 for the purpose of helping a mobile device 20 determine if they are in an optimal position for a desired image. The trigger module 39 operates to collect user 12 inputs for the purpose of constructing a trigger 291. Triggers 291 are used to specify one or more conditions 296 under which an image 221 will be captured by a venue operated camera device 40. The notification module 30 operates to receive notifications from the server device 60 and other mobile devices 20. Due to the intermittent nature of mobile networks, an offline cache 35 stores information allowing the mobile device 20 to continue limited operation while offline. Upon restoration of network connectivity, the offline cache 35 is synchronized with the repositories 71 at the server device 60.

The server device 60 is comprised of a control system 62 which is in turn comprised of an account module 65, imaging engine 66, venue module 67, shotspot module 68, camera module 69 and session module 70. The account module 65 operates to create, modify, store, and more generally manage information related to user accounts 201 in the user account repository 200. The imaging engine 66 operates to create, modify, store, and more generally manage information related to images 221 in the image repository 220. The venue module 67 operates to create, modify, store, and more generally manage information related to venues 241 in the venue repository 240. The camera module 69 operates to create, modify, store, and more generally manage information related to venue operated camera devices 40 in the camera repository 260. The session module 70 operates to create, modify, store, and more generally manage information related to sessions 271 in the session repository 270.

The venue operated camera device 40 is comprised of a control system 42 which is in turn comprised of a trigger module 43 and a trigger repository 290 used to store the triggers 291. Each trigger 291 is comprised of one or more conditions 295 under which the venue operated camera device 40 will capture an image 221.

The network 15 is preferably a distributed, public access network, such as the Internet, wherein the server device 60, mobile device 20, and venue operated camera device 40 are capable of interacting with and through the network 15 using various protocols such as Transmission Control Protocol/Internet Protocol (TCP/IP), Hypertext Transport Protocol (HTTP), and File Transfer Protocol (FTP). However, those of ordinary skill in the art will appreciate that the network 15 is not limited thereto. More specifically, the network 15 may be any type of network suitable to allow interaction between the server device 60, mobile device 20, and venue operated camera device 40. For example, the network 15 may be a wired network, a wireless network, or any combination thereof. Further, the network 15 may include a distributed computing network, an intranet, a local-area network (LAN) and/or a wide-area network (WAN), or any combination thereof.

The repositories 71, including the account repository 200, image repository 220, venue repository 240, shotspot repository 250, camera repository 260, and session repository 270, may be stored in a filesystem at the server device 60, a database, network attached storage, storage attached network, blockchain, or any combination thereof.

Figure 2A:
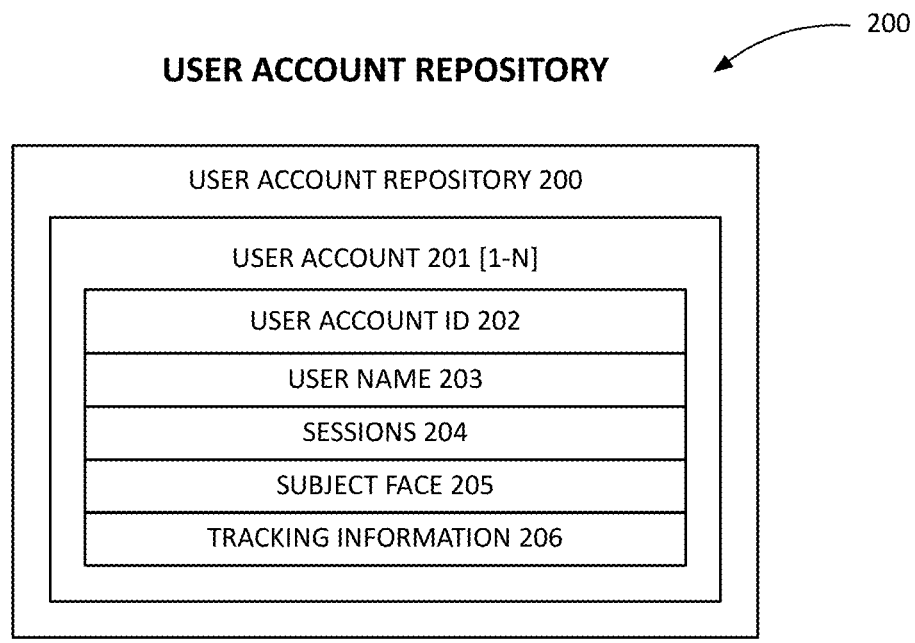
FIG. 2A illustrates an exemplary data structure for storing a user account repository according to some embodiments.

FIG. 2A illustrates an exemplary data structure 200 for storing a user account repository 200 according to some embodiments. The user account repository 200 is comprised of one or more users accounts 201 representing a one or more users 12, each user account 201 is comprised of a user account identification (ID) 202, user name 203, sessions 204, subject face 205, and tracking information 206. The users account identification (ID) 202 is a unique identifier distinguishing the account 201 from all other user accounts 201. The user's name 203 is an alpha numeric identifier which may also be unique in some embodiments. The session 271 stores information identifying zero or more sessions 271 in which the user 12 may be scheduled to participate. The subject face 205 stores information representing the face of the users 12 associated with the user's account 201 and may be used in matching the subject face of the users 12 to subject faces appearing in images. As used herein, the term subject face refers to the face of a person (subject) appearing in an image. The tracking information 206 may be used to determine the current location of the user 12 of the user's account 201 for the purpose of determining if the user 12 is at or near a venue, shotspot, or subspot.

It should be noted that a user account is not needed to use a spotshot. A user with a mobile device 20 may approach an idle shotspot 251 and initiate a session 271 simply by arriving at the shotspot 251. The user may access the images 221 simply by knowing the shotspot 251 location and the time at which the images 221 were taken. Creating a user account 201 however, allows the user 12 to input profile information that allows the server device 60 to auto send notifications when images 221 are captured in which the subject appears. This process is illustrated further in FIG. 7.

While it is possible to schedule a session at a shotspot, in some embodiments it is not required. In these embodiments, a session is auto-created when a user arrives at a shotspot that is not in use and not schedule for use for a venue operator defined time period. This is referred to herein as an unscheduled-session. Images may be tagged with the session in which they were taken to provide a convenient way to access all images captured during the session. An unscheduled-session is terminated when the user leaves the shotspot location and/or a user for a scheduled session arrives at the shotspot location.

Figure 2B:
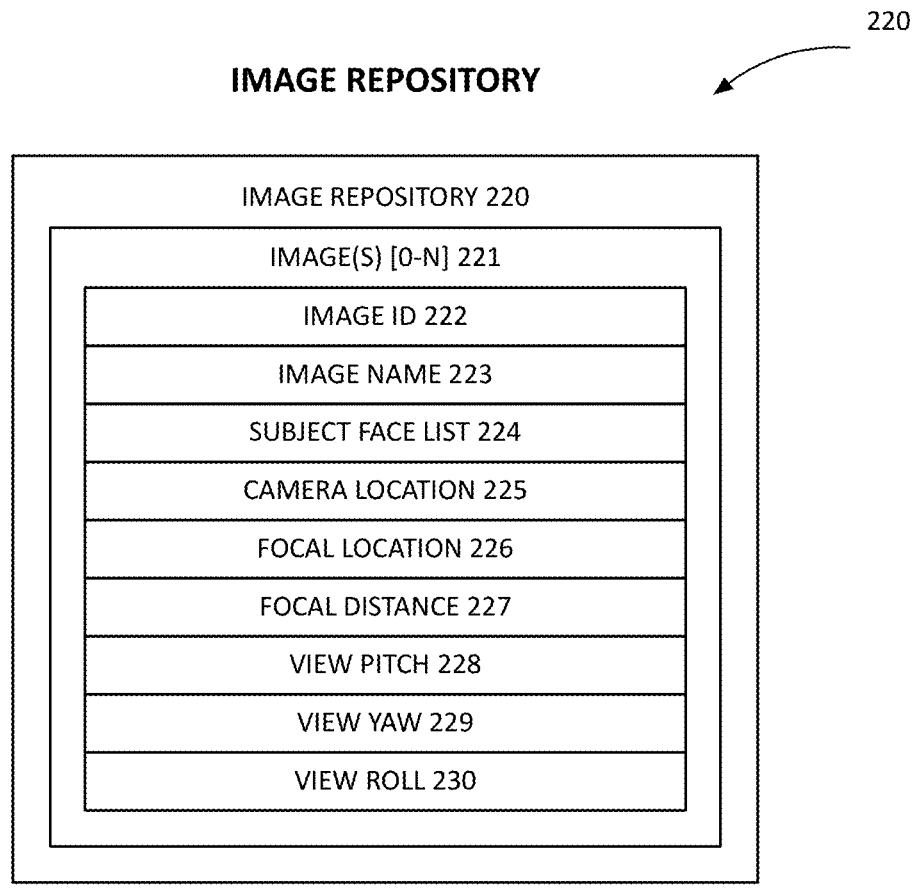
FIG. 2B illustrates an exemplary data structure for storing an image repository according to some embodiments.

FIG. 2B illustrates an exemplary data structure 220 for storing an image repository 220 according to some embodiments. The imaging engine 66 performs operations on the image repository 220. The image repository 220 stores zero or more images 221. Each image 221 includes an image identification (ID) 222, image name 223, subject face list 224, camera location 225, focal location 226, focal distance 227, camera pitch 228, camera yaw 229, and camera roll 230. The image identification (ID) 222 uniquely identifies the image within the system. The image name 223 stores the alpha numeric name of the image. The subject face list 224 stores a list of the subject faces appearing in the image. The camera location 225 stores the geographic location at which the image was captured. The focal location 226 stores the geographic location at which the venue operated camera device 40 was pointed when the image was captured. The focal distance 227 stores the distance between the camera and the focal point(s)(the subspots). The camera pitch 228 stores the vertical viewing angle. The camera yaw 229 stores the horizontal viewing angle. The camera roll 230 stores the rotation angle along the viewing axis.

Figure 2C:
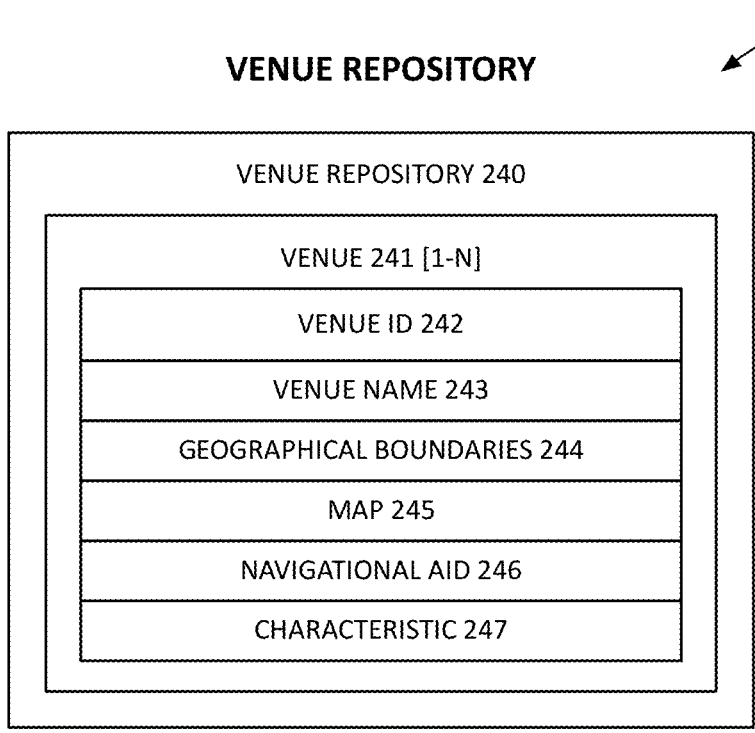
FIG. 2C illustrates an exemplary data structure for storing a venue repository according to some embodiments.

FIG. 2C illustrates an exemplary data structure 240 for storing a venue repository 240 according to some embodiments. The venue repository 240 is comprised of one or more venues 241, each comprising a venue identification (ID) 242, venue name 243, geographical boundaries 244, a map 245, navigational aid 246, and characteristics 247 information. The venue identification (ID) 242 uniquely identifies the venue 241 from all other venues 241. The venue name 243 is an alpha numeric identifier which may also be unique in some embodiments. The geographical boundary 244 information identifies the geographical area encompassed by the venue 241 and may be of any shape including an arbitrary shape. The map 245 stores information identifying a map illustrating the area comprising the venue 241. The navigation aid 246 information identifies one or more navigational aids that may be used in enabling a user to navigate to the venue 241 from a current position. The characteristics 247 information stores information identifying characteristics of the venue 241.

Examples of venues include sports, monuments, famous buildings, stadiums, vistas, restaurants, hotels, concerts, zoos, museums, street locations (Abbey Road, Times Square, Golden Gate Bridge etc.), Famous Landmarks (Mt. Rushmore, Great Pyramids, Ford's Theatre) . . . .

Figure 2D:
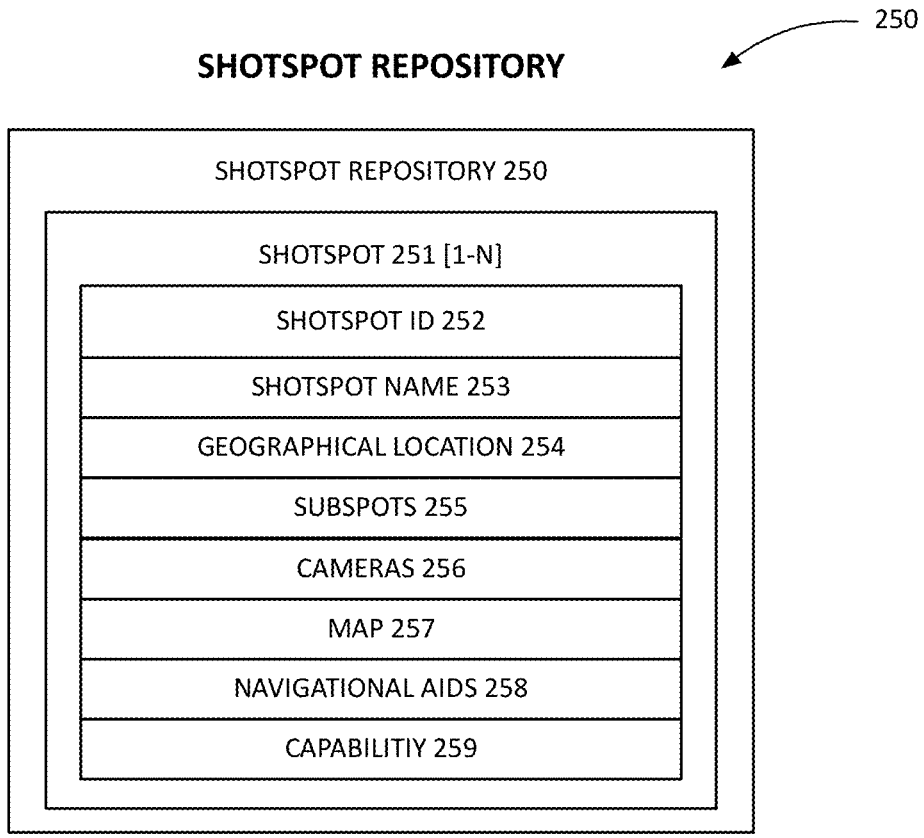
FIG. 2D illustrates an exemplary data structure for storing a shotspot repository according to some embodiments.

FIG. 2D illustrates an exemplary data structure 250 for storing a shotspot repository 250 according to some embodiments. The shotspot repository 250 is comprised of one or more shotspots 251, each comprising a shotspot identification (ID) 252, shotspot name 253, geographical location 254, one or more subspots 255, one or more cameras 256, a map 257, navigational aids 258, and capability information 259. The shotspot identification (ID) 252 uniquely identifies the shotspot 251 from all other shotspots 251. The shotspot name 253 is an alpha numeric identifier which may also be unique in some embodiments. The geographical location 254 stores the GPS coordinates of the shotspot 251. Each shotspot 251 is comprised of one or more subspots 255. Each shotspot 251 is comprised of one or more cameras 256. The map 255 stores information identifying a map illustrating the area encompassing the shotspot 251. The navigational aid 258 information identifies one or more navigational aids 258 that may be used in enabling a mobile to navigate and find the shotspot 251 within the venue 241. The capabilities 259 information stores information identifying capabilities of the shotspot 251.

In some embodiments, spotshots and/or subspots are physically marked. GPS position has typically been accurate within a few meters. This accuracy may be improved through cell tower triangulation and WIFI signal geolocating (services such as SkyHook Wireless), but in some cases, may still be lacking accuracy. In these embodiments, physical markers may be used to provide additional positioning cues. Note that recent improvements in GPS technology and upgrades to GPS satellites promise to improve GPS accuracy to within a foot.

Figure 2E:
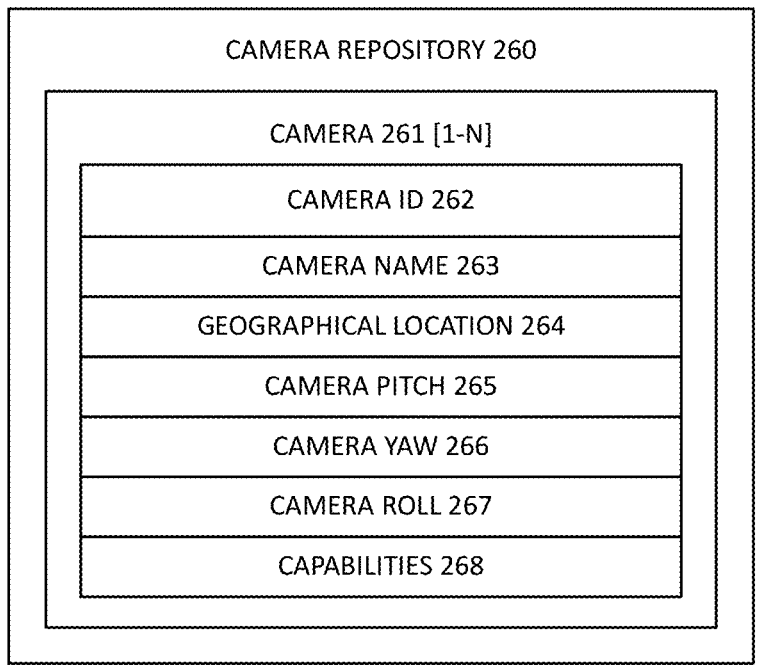
FIG. 2E illustrates an exemplary data structure for storing a camera repository according to some embodiments.

FIG. 2E illustrates an exemplary data structure 260 for storing a camera repository 260 according to some embodiments. The camera repository 260 is comprised of one or more cameras 261, each comprising a camera identification (ID) 262, camera name 263, geographical location 264, camera pitch 265, camera yaw 266, camera roll 267, and capabilities 268. The camera identification (ID) 262 uniquely identifies the camera from all other cameras 261. The camera name 263 is an alpha numeric identifier which may also be unique in some embodiments. The geographical location 264 stores the GPS coordinates of the camera 261. The camera pitch 265 stores the vertical viewing angle. The camera yaw 266 stores the horizontal viewing angle. The camera roll 267 stores the rotation angle along the viewing axis. The capabilities 268 information stores information identifying capabilities of the camera 261.

Figure 2F:
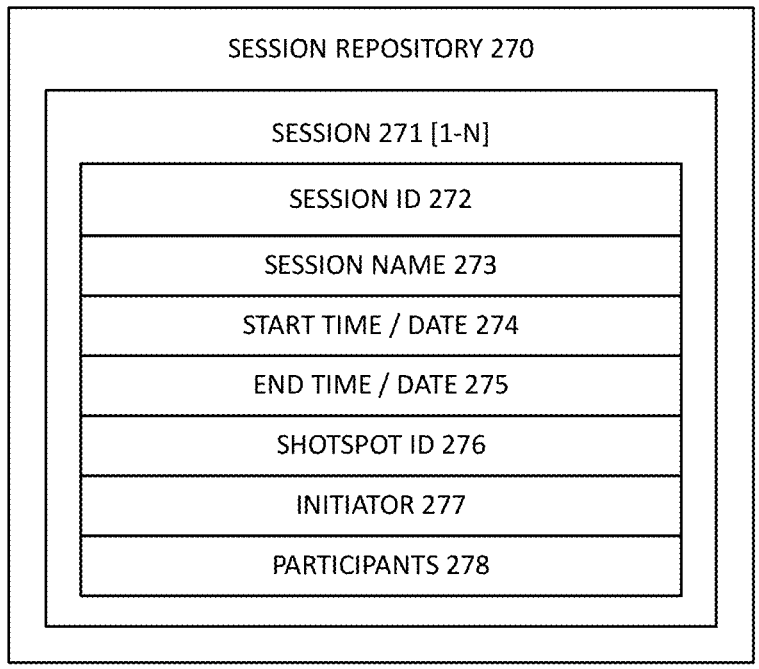
FIG. 2F illustrates an exemplary data structure for storing a session repository according to some embodiments.

FIG. 2F illustrates an exemplary data structure 270 for storing a session repository 270 according to some embodiments. The session repository 270 is comprised of one or more sessions 271, each comprising a session identification (ID) 272, session name 273, start time/date 274, end time/date 275, shotspot identification (ID) 276, initiator 277, and participants 278. The session identification (ID) 272 uniquely identifies the session from all other sessions 261. The session name 263 is an alpha numeric identifier which may also be unique in some embodiments. The start time/date 274 indicates the starting time and date of the session. The end time/date 275 indicates the ending time and date of the session. The shotspot identification (ID) 276 identifies the shotspot associated with the session. The initiator 277 identifies the mobile scheduling the session. The initiator 277 identifies zero or more participants invited to the session.

Figure 2G:
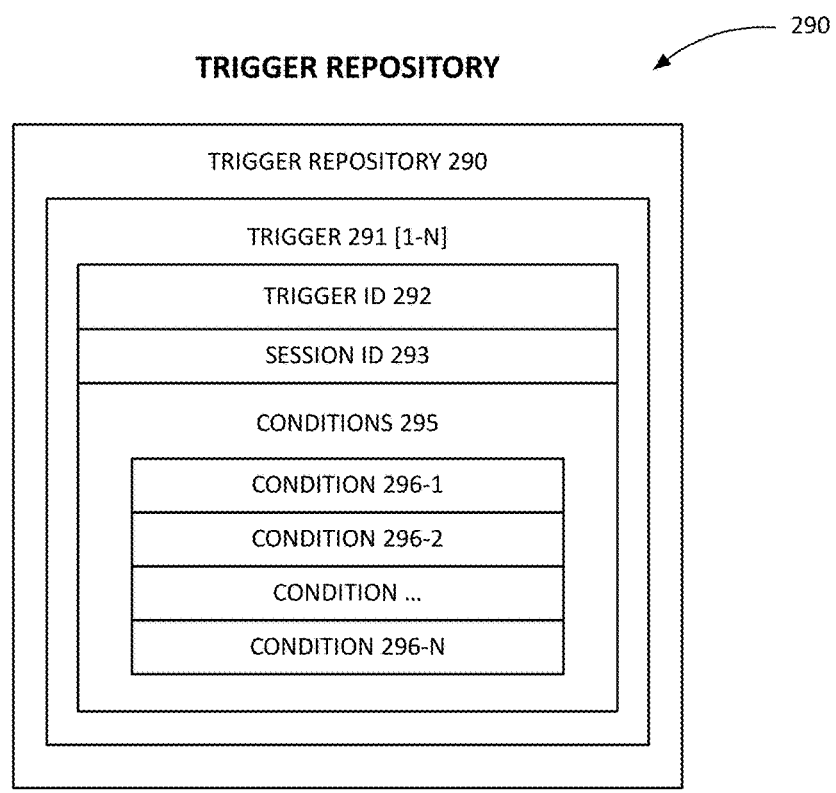
FIG. 2G illustrates an exemplary data structure for storing a trigger repository according to some embodiments.

FIG. 2G illustrates an exemplary data structure 290 for storing a trigger repository 290. The trigger repository 290 is comprised of one or more triggers 291, each trigger including a trigger identification (ID) 292, session identification (ID) 293, and one or more conditions 295. Each condition represents a state which must be met before an image is saved (images are continuously taken to determine if conditions are being met, however only those satisfying all conditions are saved in some embodiments). Triggers 291 with more than one conditions 296 are referred to herein as complex triggers. An example of a complex trigger would be ((SUBJECT==JOE) AND (EMOTION==SMILING) AND (POSITION==FACING)). This trigger 291 specifies that the subject "Joe" must be at the shotspot, the subject must be smiling, and facing the camera. Example of triggers are shown below. As illustrated in the above example, complex triggers may be combined by Boolean operators.

| TRIGGER | DESCRIPTION |
|---|---|
| Facial Expression | One or more images are stored after first detection of facial characteristic matching specified characteristic |
| Manual | One or more images are stored after manual trigger received (continuous mode) |
| Timer | One or more images are stored after a specified time period after manual trigger received |
| Time | One or more images are stored starting at a specific time |
| Voice | One or more images are stored after first detection of voice command matching voice command |
| Gesture | One or more images are stored after first detection of physical gesture matching specified physical gesture |
| Subject | One or more images are stored after first detection of subject matching specified subject |
| Subject Location | One or more images are stored after first detection of a subject arriving at shotspot |
| Exclude | specific subjects (users) may be excluded |
| Feedback | Specify feedback provided by camera. For example provide multiple flashes prior to first capture or providing a flash when a trigger is met |

Triggers may also include negative limitations. For example, a trigger 291 may specify that one or more specific subjects not be in an image. This will help a user prevent having their picture taken with certain people and/or specific locations.

Figure 3:
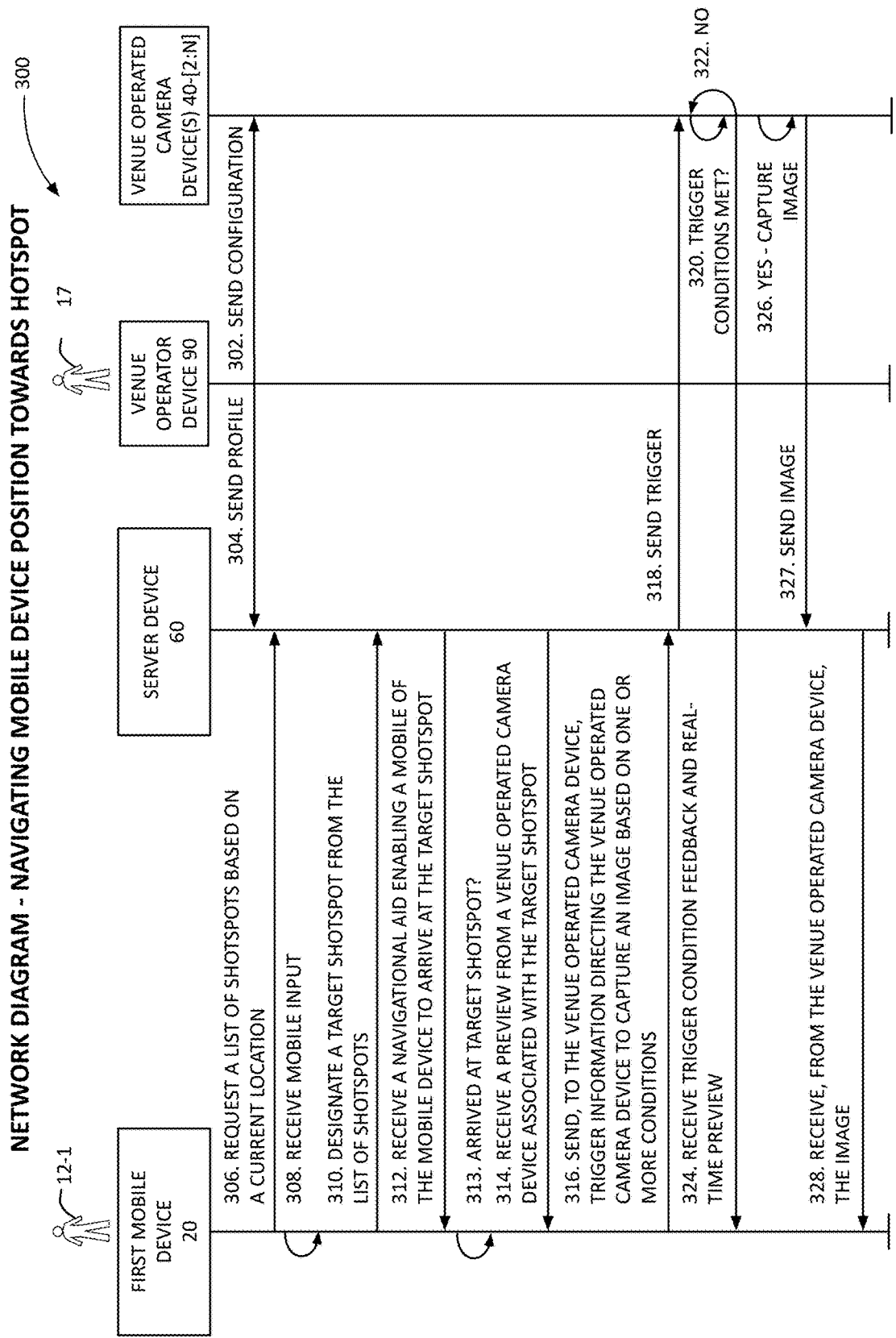
FIG. 3 illustrates an exemplary network diagram for navigating a mobile device towards a shotspot.

FIG. 3 illustrates an exemplary network diagram 300 for navigating a mobile device towards a shotspot 251. A venue operator configures 302 one or more cameras 40 and sends 304 profile information regarding the shotspot geographic location, subspot geographic locations, camera geographic locations, camera capabilities, etc. to the server device 60. A first mobile device 20-1 subsequently requests 306 information on available shotspot 251 locations based on a current location. Input is received 308 at the first mobile device 20-1. Based on the received user input, a target shotspot is designated 310 by the first mobile device 20-1. Navigational aids 258 enabling a user of the mobile device 20 to arrive at the target shotspot are received at the first mobile device 20-1 from the server device 60. A preview from a venue operated camera device 40 associated with the target shotspot is sent 314 by the server device 60 to the first mobile device 20-1. Trigger 291 information is sent 316 from the first mobile device 20-1 to the server device 60. The trigger 291 information is then forwarded 318 to one or more venue operated camera devices 40. The trigger 291 information identifies one or more conditions 296 that are to be met prior to the venue operated camera device 40 taking an image. The venue operated camera device 40 tests the trigger condition (s) repeatedly 322 to determine 320 when they are met. While the trigger condition has not been met, trigger condition feedback may be sent 324 to both the first mobile device 20-1 and second mobile devices 20-[2:N]. The trigger information may provide information identifying actions that need to be taken by the users 12-[1:N] of the mobile devices 12-[1:N] to satisfy the trigger. In addition, real-time preview information may be sent allowing ones of the of the users 12-[1:N] of the mobile devices 12-[1:N] to view on the screens of their respective mobile device devices 12-[1:N] the images being captured by the camera(s) 40. The real-time preview may take the form of a sequence of images or reduced resolution images, and/or video information. Upon capture 326, the image(s) are sent 327 to the server device 60 for storage. The image(s) 221 may be forwarded to the mobile devices 12-[1:N].

Once met, the camera device 40 saves the images 221 according to the trigger 291 information.

Figure 4:
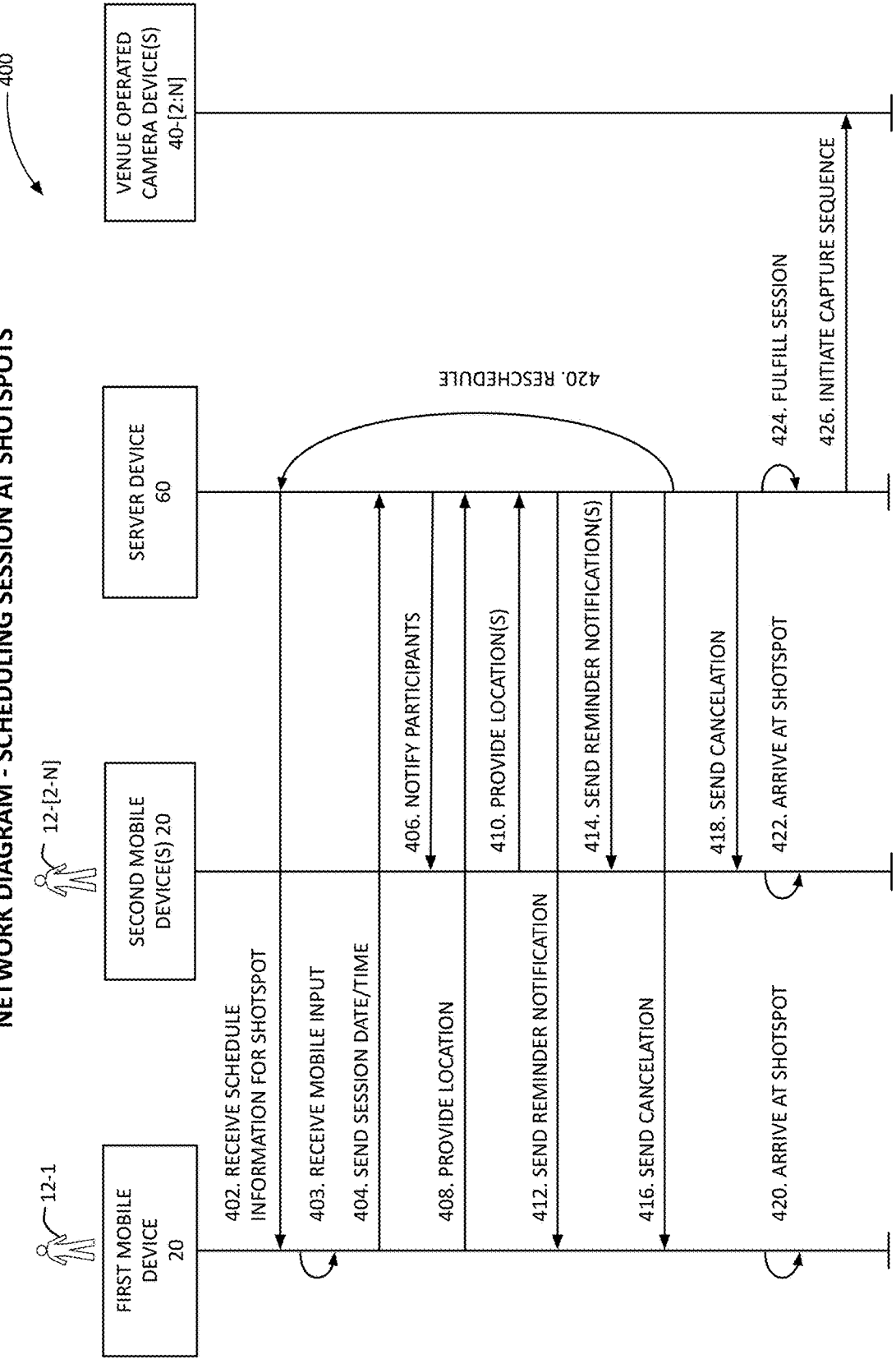
FIG. 4 illustrates an exemplary network diagram for scheduling a session at a shotspot.

FIG. 4 illustrates an exemplary network diagram 400 for scheduling a session 271 at a shotspot 251. Schedule information for a shotspot 251 is received at a first mobile device 20-1 from the server device 60. User inputs are received at the first mobile device 20-1. Based on the user inputs, session information is sent to the server device 60. In some embodiments, one or more second mobile devices 20-[2:N] associated with participants included in the session 271 are notified 406. As session time nears, geographic locations are periodically provided 408 410 to the server device 60. Those participants that are not progressing at a sufficient pace are sent reminder notifications 412 414. If it becomes clear, as evidenced by the geographic locations of the first mobile device 20-1 and second mobile devices 20-[2:N], that all participants will not arrive on time, the server device 60 may cancel the session 416-418, and enable the first mobile device 20-1 to reschedule 420. Once the first mobile device 20-1 and second mobile devices 20-[2:N] arrive at the shotspot 251, the session is fulfilled 424 and the capture sequence may be initiated 426. In some embodiments, a notice to cancel a session will include open times/dates to reschedule.

Figure 5:
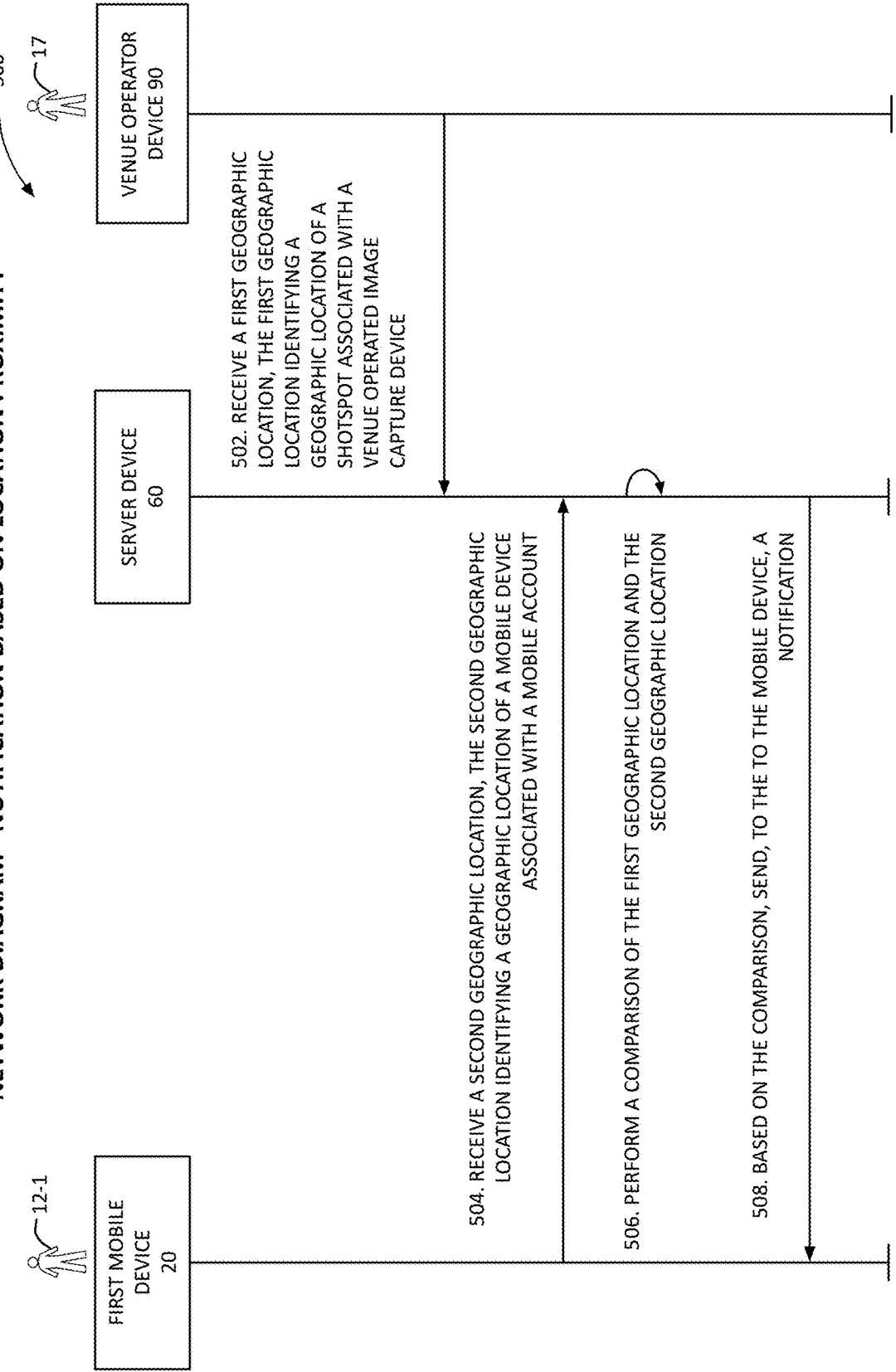
FIG. 5 illustrates an exemplary network diagram for notifying a mobile device when they are near a shotspot.

FIG. 5 illustrates an exemplary network diagram 500 for notifying a user when they are near a shotspot 251. The server device 60 receives 502 first geographic location identifying a geographic location of a shotspot 251 associated with one or more venue operated camera devices 40. The first geographic location may be provided by a venue operator device 90. In some embodiments, the first geographic location may be self-identified by a venue operated camera device 40. A second geographic location is received 504 at the server device 60 from the first mobile device 20-1. A comparison is performed 506 between the first geographic location and the second geographic location. If the first geographic location and the second geographic location are close enough in geographical proximity, the server device 60 sends 508 a notification to the first mobile device identifying the shotspot 251.

Figure 6:
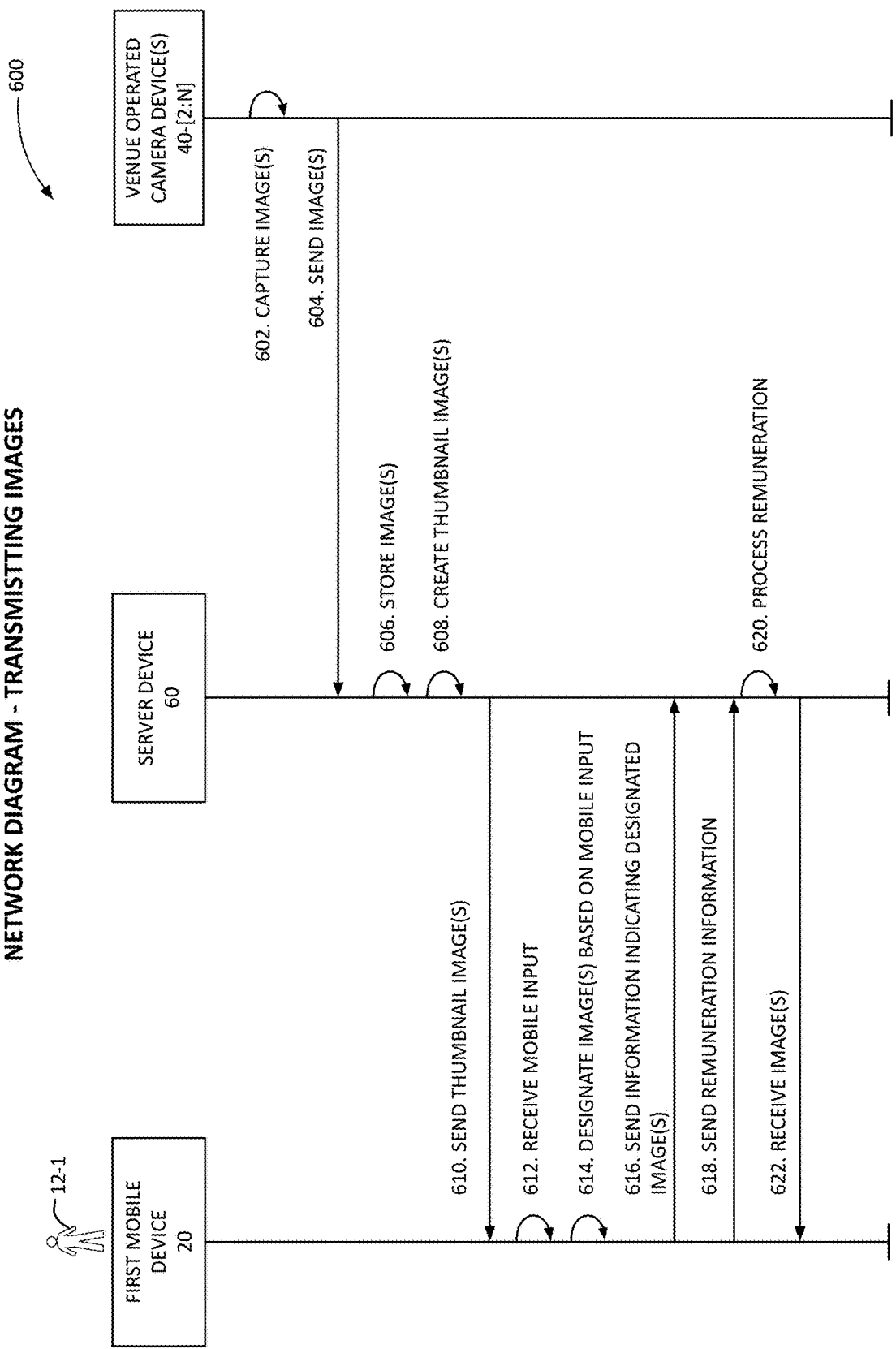
FIG. 6 illustrates an exemplary network diagram for transmitting images from a venue operated camera device to a mobile device.

FIG. 6 illustrates an exemplary network diagram 600 for transmitting images from a venue operated camera device 40 to a mobile device 20. Images are captured 602 by the venue operated camera device 40. The images are sent 604 from the venue operated camera device 40 to the server device 60. The images are stored 606 by the server device 60 in the image repository 220. Thumbnails are created 608 by the imaging engine 66 of the server device 60 and sent 610 to the mobile device 20. User input is received 612 at the mobile device 20. One or more images are designated 614 based on the user input. Information indicating the designated one or more images is sent 616 to the server device 60. In some embodiments, remuneration information is sent 618 from the mobile device 20 to the server device 60. In these embodiments, the remuneration is processed 620 at the server device 60. The one or more images are received 622 at the mobile device 20.

Figure 7:
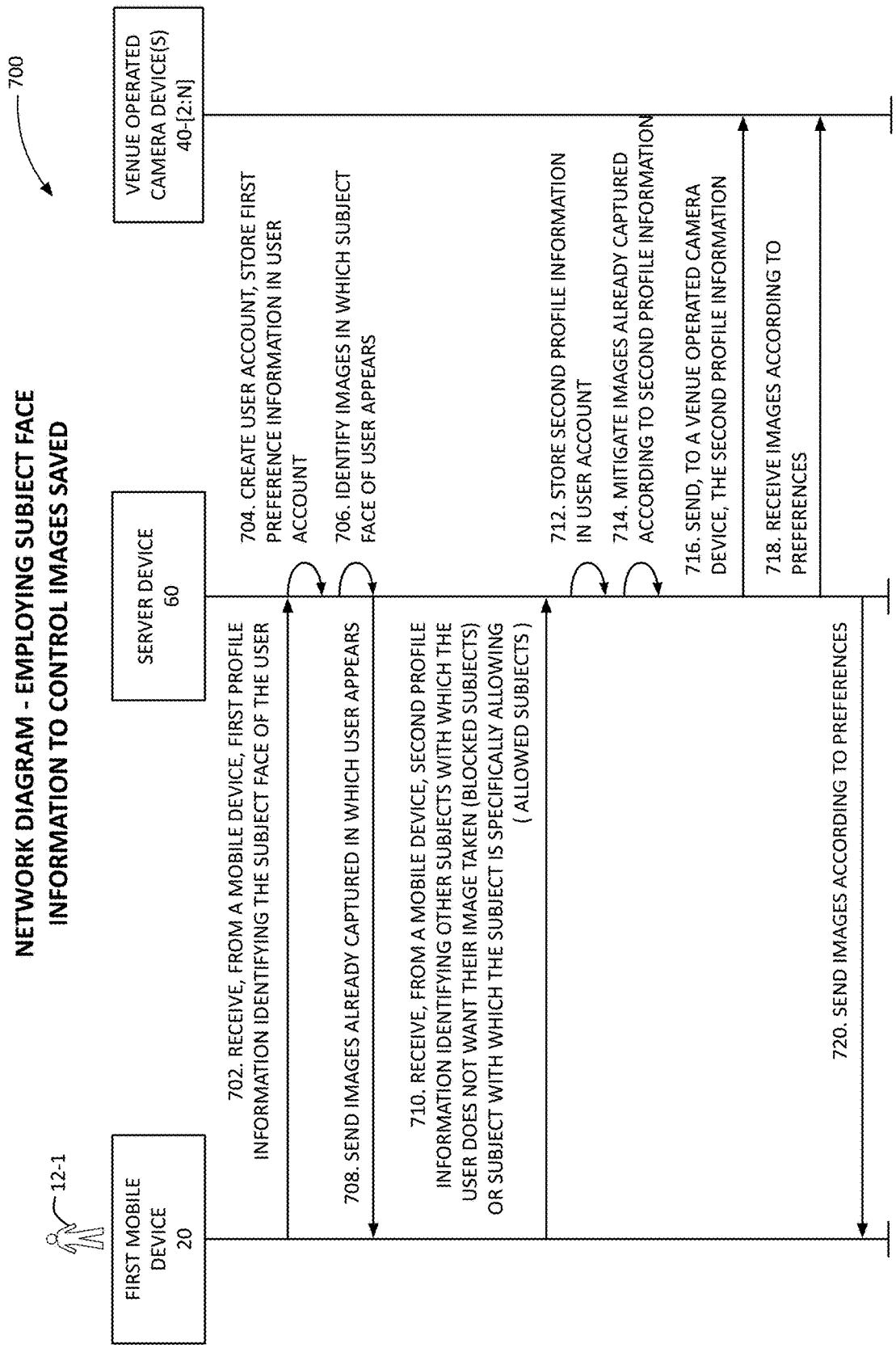
FIG. 7 illustrates an exemplary network diagram for employing subject face information to control images saved.

FIG. 7 illustrates an exemplary network diagram 700 for employing subject face information. First profile information is received 702 from a first mobile device 20 at a server device 60. If a user account 201 has not already been created, a new user account 201 is created. In either case, the first profile information is stored 704 in the user account 201 of the user 12 associated with the first mobile device 20. The first profile information includes a subject face of the user 12 associated with the first mobile device 20. Images are identified 706 in which the subject face appears, and sent 708 to the first mobile device 20. The server device receives 710 second profile information identifying one or more other subject faces which is also stored 712 in the user account 201. The one or more other subject faces specify either blocked subjects or allowed subjects (but not both). The second profile information is used to identify other images to be mitigated 714. The mitigation may take the form of deleting the images 221 or quarantining the images 221 until such time that the user approves each of the images 221. In some embodiments, the second profile information is sent to the venue operated camera device 40 to allow for blocking at the camera. In this embodiment, images are received from the venue operated camera device 40 according to the second profile information. Otherwise the filtering according to the second profile information occurs at the server device 60. If second profile information is not supplied by a user, then that subject allows all subjects to appear in any image with them (and not subjects are blocked).

Figure 8A:
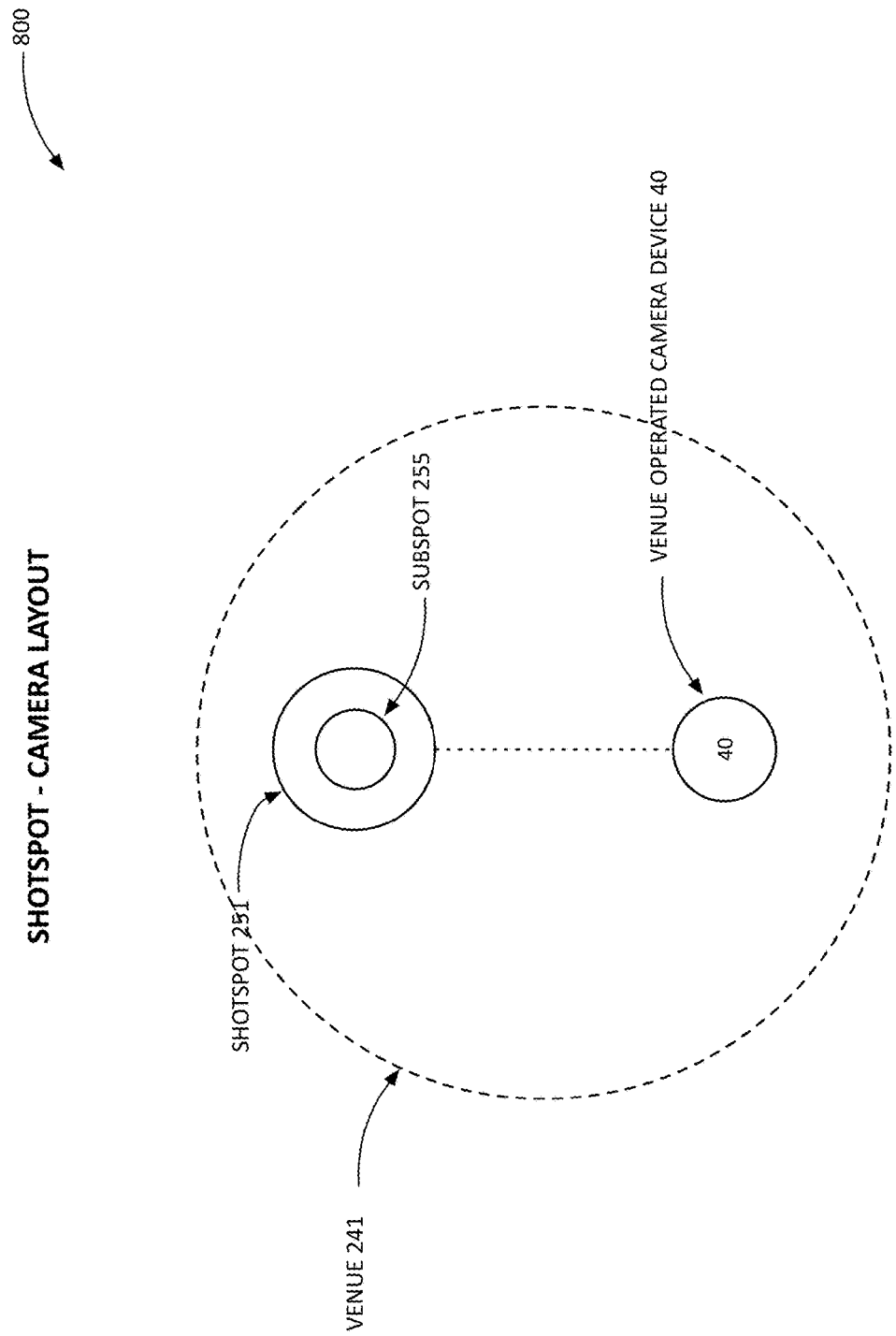
FIG. 8A illustrates an exemplary diagram showing the relationships between venue, shotspot, subspot, and camera.

FIG. 8A illustrates an exemplary diagram 800 showing the relationships between venue 241, shotspot 251, subspot 255, and venue operated camera devices 40. A venue 241 may include one or more shotspots. Each shotspot 251 may include one or more subspots 255. For a shotspot 251 that has only one subspot 255, the shotspot 251 and subspot 255 have the exact same geographic location. For a shotspot 251 with two or more subspots 255, the geographic location of the shotspot 251 is the average position of the subspots 255. Each shotspot 251 may have one or more venue operated camera devices 40 pointed at the shotspot 251. In some embodiments, there may be a single venue operated camera device 40 and multiple subspots 255. In some embodiments, there may be a single shotspot 251 and multiple venue operated camera devices 40. In some embodiments, there may be multiple venue operated camera devices 40 and multiple subspots 255. The arrangement, configuration, and operation of the shotspot 251 may be conducted by a venue operator.

Figure 8B:
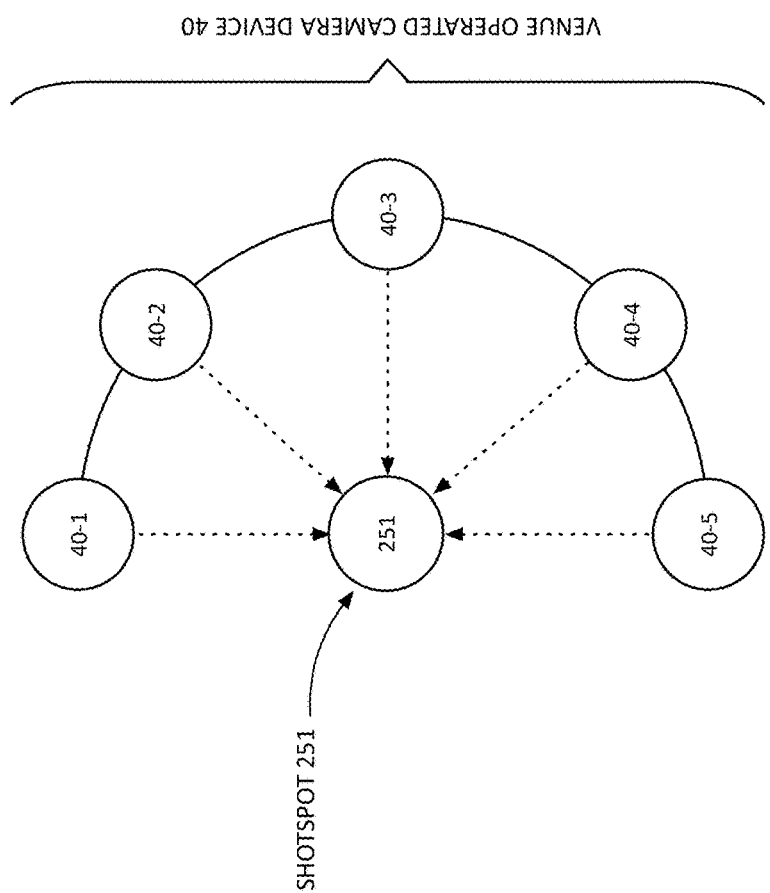
FIG. 8B illustrates an exemplary diagram showing a shotspot with multiple cameras.

FIG. 8B illustrates an exemplary diagram 820 showing a shotspot 251 with multiple venue operated camera devices 40. In this particular arrangement, there are five venue operated camera devices 40 pointed at a single shotspot 251 with a single subspot 255 (not shown).

Figure 8C:
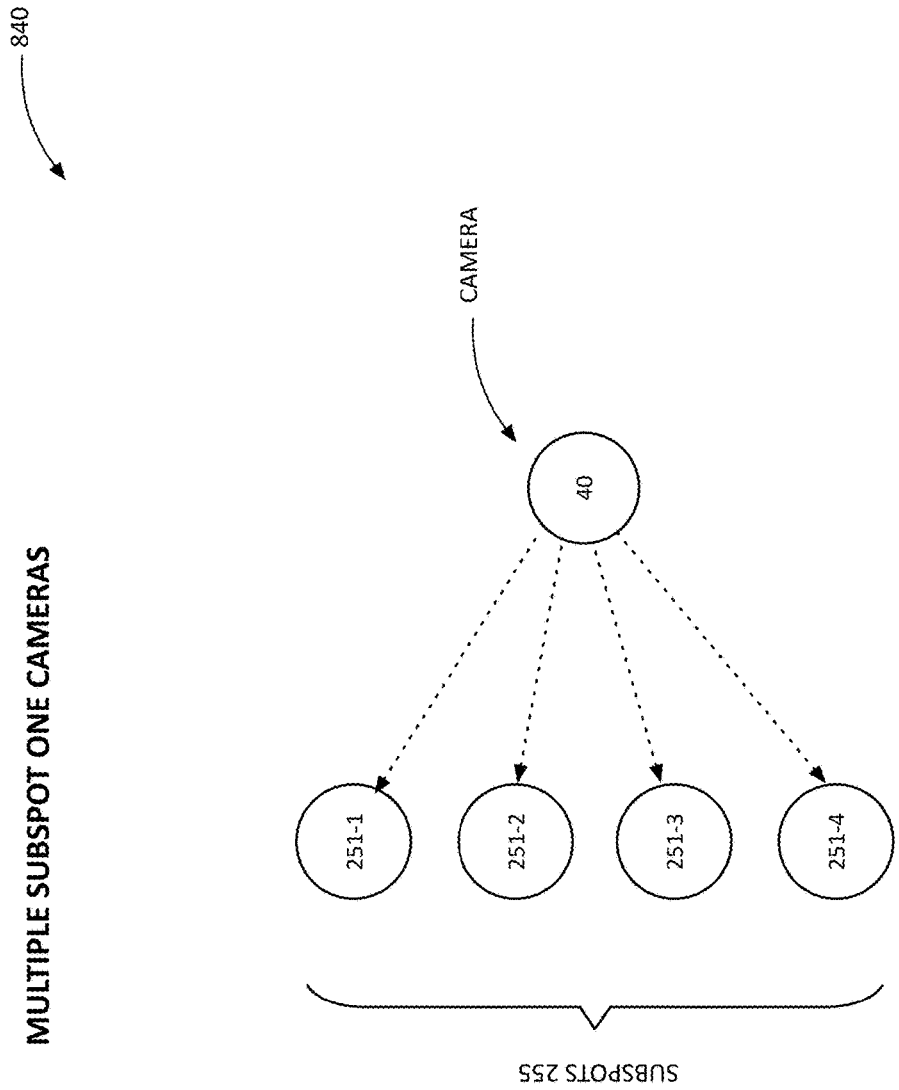
FIG. 8C illustrates an exemplary diagram showing a shotspot with multiple subspots and a single camera.

FIG. 8C illustrates an exemplary diagram 840 showing a shotspot 251 with multiple subspots 255 and a single venue operated camera devices 40. In this particular arrangement, the single venue operated camera devices 40 is pointed at a shotspot 251 comprised of four subspots 225.

FIG. 9 is a graphical illustration 900 of an exemplary shotspot 251 with nine subspots 255 and a single venue operated camera devices 40. In this diagram, the participants of the shotspot 251 are all present.

Figure 10:
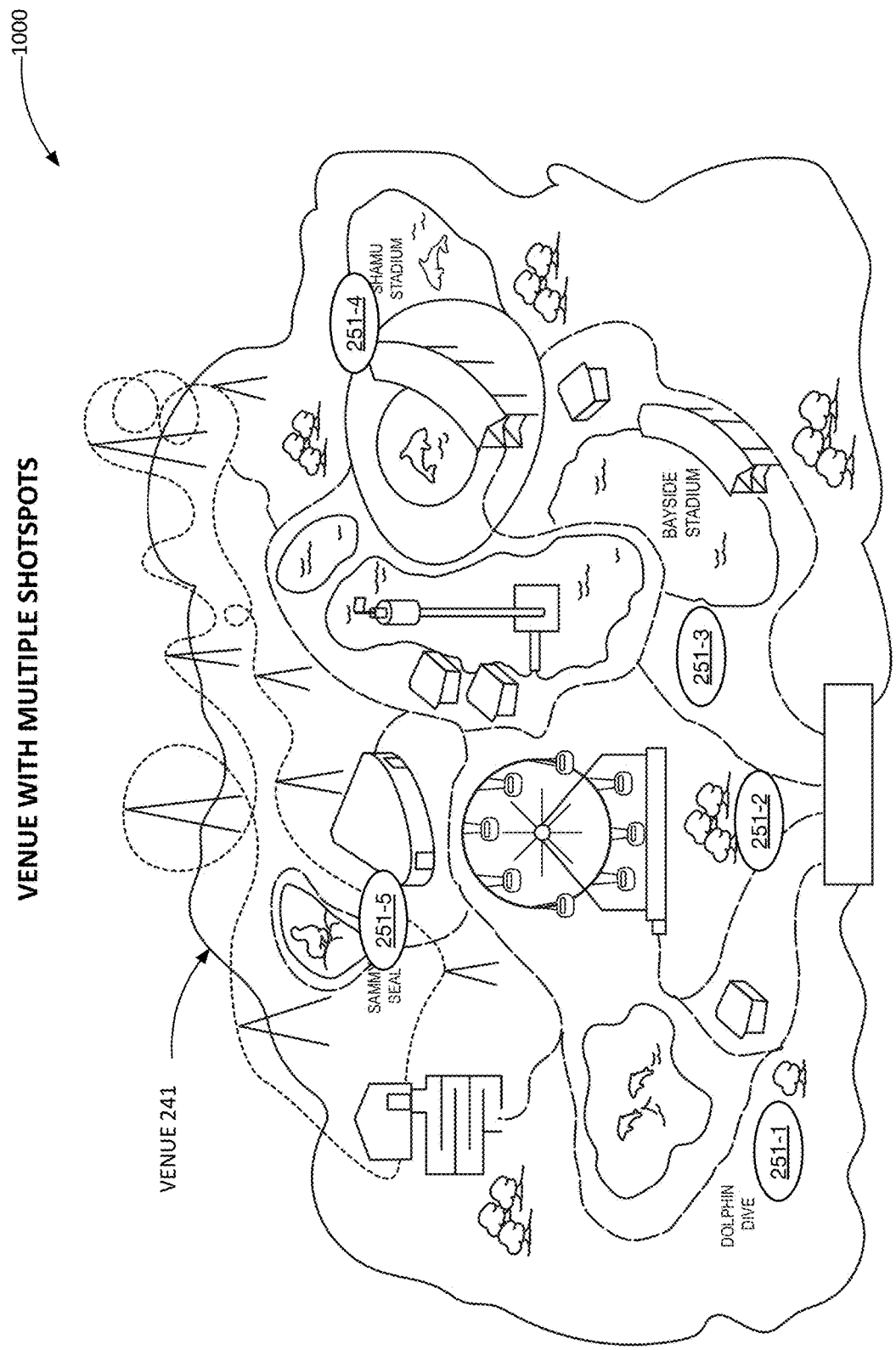
FIG. 10 illustrates an exemplary venue with multiple shotspots.

FIG. 10 is a graphical illustration 1000 of an exemplary venue 241 with multiple shotspots 251.

Figure 11A:
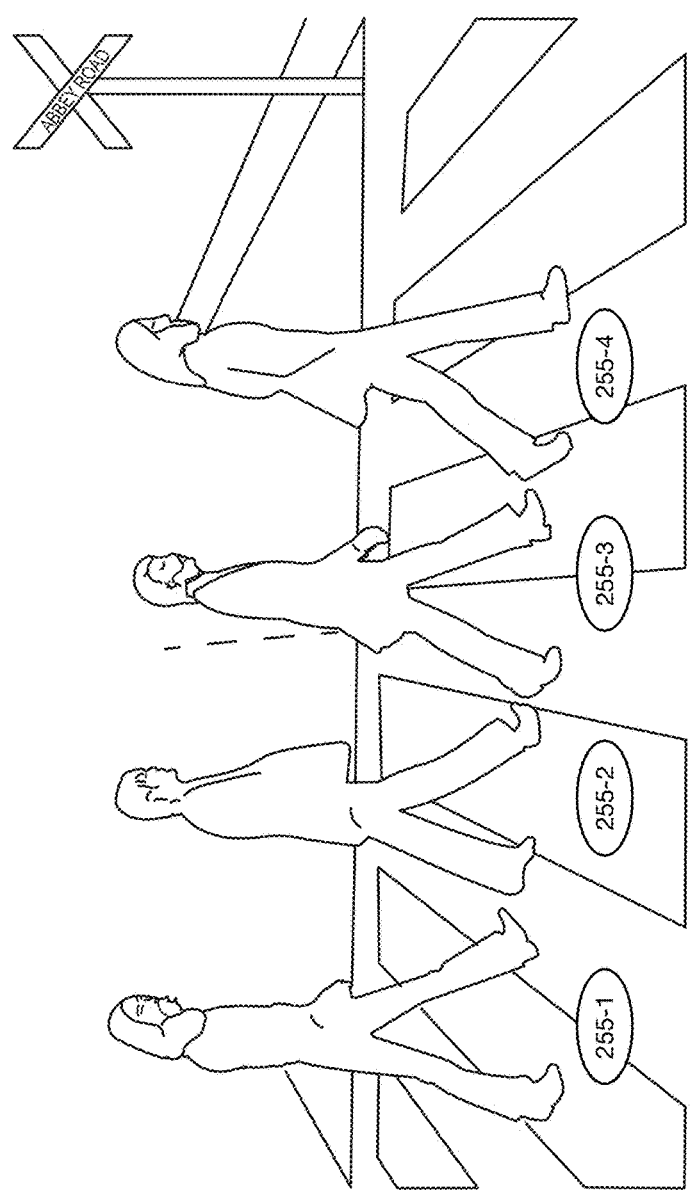
FIG. 11A illustrates an exemplary shotspot arranged at the Abbey Road Crossing as viewed from the camera placement.

FIG. 11A is a graphical illustration 1100 of an exemplary shotspot 251 arranged at the Abbey Road Crossing as viewed from the venue operated camera device 40 viewpoint.

Figure 11B:
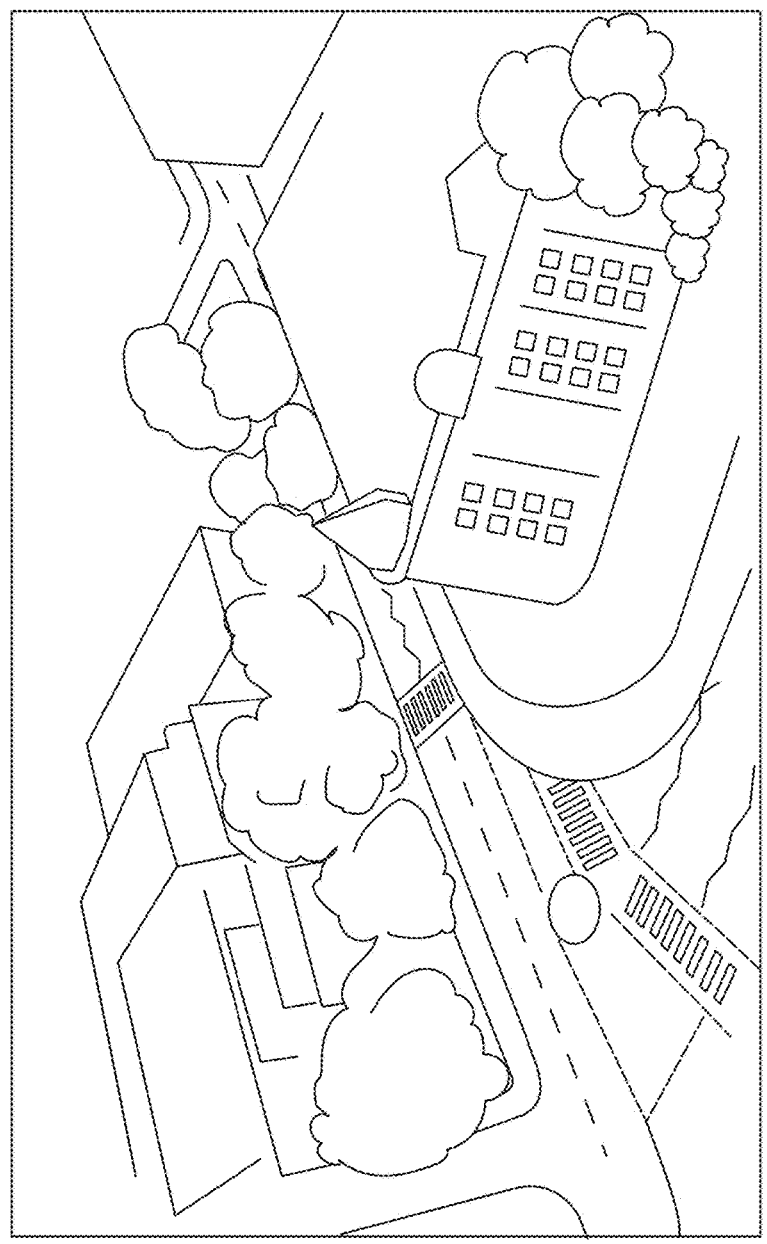
FIG. 11B illustrates an exemplary shotspot arranged at the Abbey Road Crossing as viewed from a second viewpoint.

FIG. 11B is a graphical illustration 1120 of an exemplary shotspot 251 arranged at the Abbey Road Crossing as viewed from a second viewpoint.

Figure 11C:
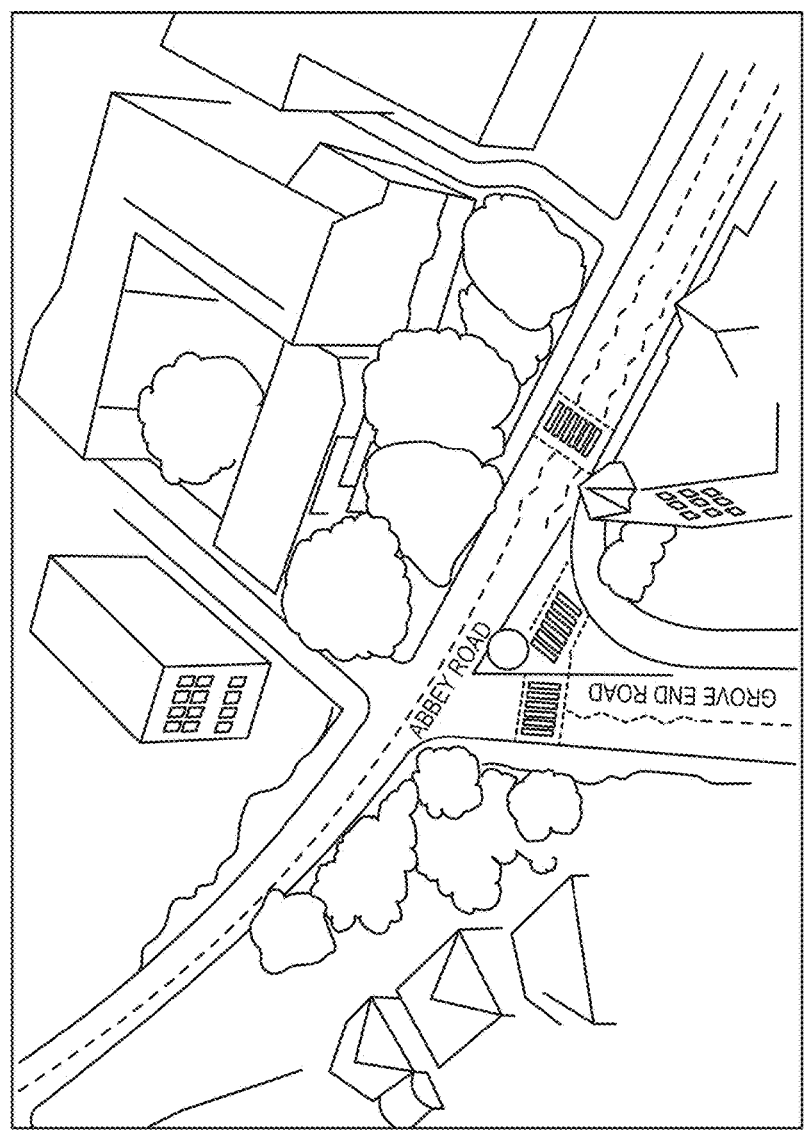
FIG. 11C illustrates an exemplary shotspot arranged at the Abbey Road Crossing as viewed from a third viewpoint.

FIG. 11C is a graphical illustration 1140 of an exemplary shotspot 251 arranged at the Abbey Road Crossing as viewed from a third viewpoint.

Figure 11D:
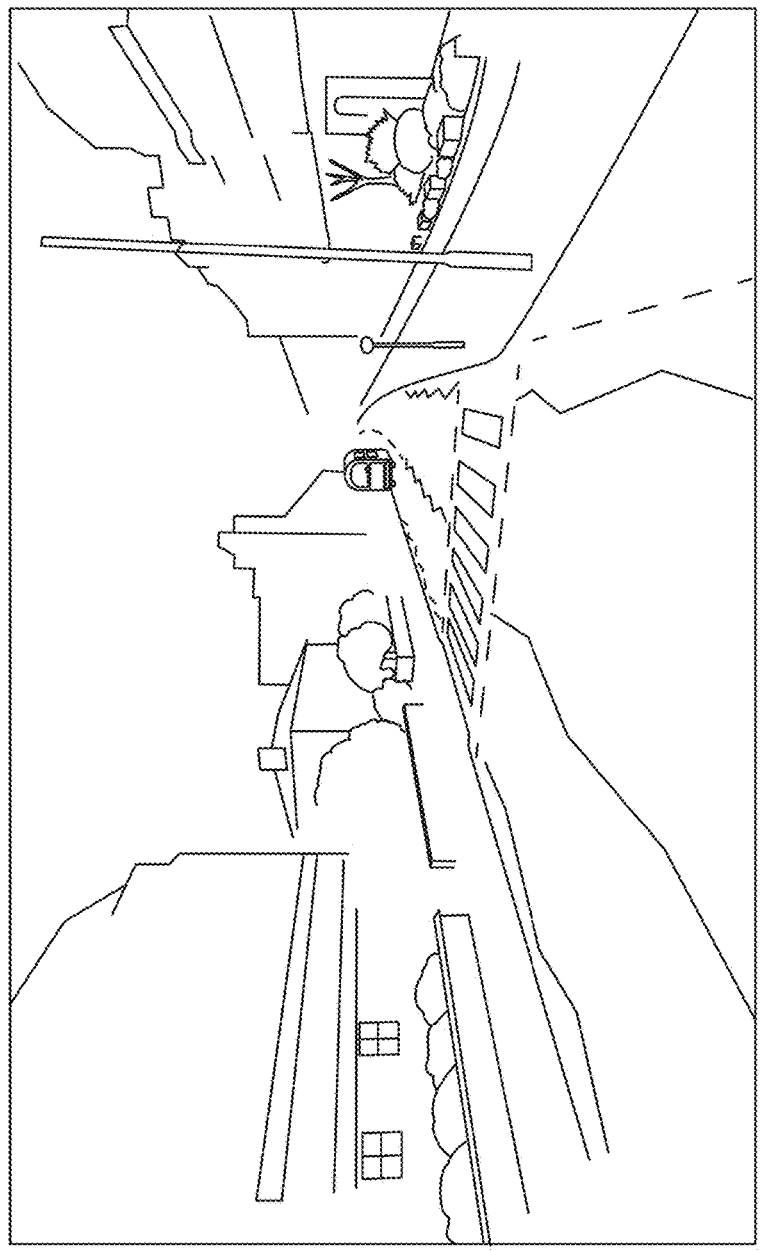
FIG. 11D illustrates an exemplary shotspot arranged at the Abbey Road Crossing as viewed from a fourth viewpoint.

FIG. 11D is a graphical illustration 1160 of an exemplary shotspot 251 arranged at the Abbey Road Crossing as viewed from a fourth viewpoint.

FIG. 12 is a block diagram illustrating components of a machine 1200, according to some embodiments, able to read instructions from a machine-readable medium 1238 (e.g., a machine-readable storage medium) and perform any one or more of the methodologies discussed herein. Specifically, FIG. 12 shows a diagrammatic representation of the machine 1200 in the example form of a computer system, within which instructions 1216 (e.g., software, a program, an application, an applet, an app, client, or other executable code) for causing the machine 1200 to perform any one or more of the methodologies discussed herein can be executed. In alternative embodiments, the machine 1200 operates as a standalone device or can be coupled (e.g., networked) to other machines 1200. In a networked deployment, the machine 1200 may operate in the capacity of a server machine or a client machine in a server-client network environment, or as a peer machine in a peer-to-peer (or distributed) network environment. The machine 1200 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), a digital picture frame, a TV, an Internet-of-Things (IoT) device, a camera, other smart devices, a web appliance, a network router, a network switch, a network bridge, or any machine capable of executing the instructions 1216, sequentially or otherwise, that specify actions to be taken by the machine 1200. Further, while only a single machine 1200 is illustrated, the term "machine" shall also be taken to include a collection of machines 1200 that individually or jointly execute the instructions 1216 to perform any one or more of the methodologies discussed herein.

In various embodiments, the machine 1200 comprises processors 1210, memory 1230, and I/O components 1250, which can be configured to communicate with each other via a bus 1202. In an example embodiment, the processors 1210 (e.g., a central processing unit (CPU), a reduced instruction set computing (RISC) processor, a complex instruction set computing (CISC) processor, a graphics processing unit (CPU), a digital signal processor (DSP), an application specific integrated circuit (ASIC), a radio-frequency integrated circuit (RFIC), another processor, or any suitable combination thereof) include, for example, a processor 1212 and a processor 1214 that may execute the instructions 1216. The term "processor" is intended to include multi-core processors 1210 that may comprise two or more independent processors 1212, 1214 (also referred to as "cores") that can execute instructions 1216 contemporaneously. Although FIG. 12 shows multiple processors 1210, the machine 1200 may include a single processor 1210 with a single core, a single processor 1210 with multiple cores (e.g., a multi-core processor 1210), multiple processors 1212, 1214 with a single core, multiple processors 1210, 1212 with multiples cores, or any combination thereof.

The memory 1230 comprises a main memory 1232, a static memory 1234, and a storage unit 1236 accessible to the processors 1210 via the bus 1202, according to some embodiments. The storage unit 1236 can include a machine-readable medium 1238 on which are stored the instructions 1216 embodying any one or more of the methodologies or functions described herein. The instructions 1216 can also reside, completely or at least partially, within the main memory 1232, within the static memory 1234, within at least one of the processors 1210 (e.g., within the processor's cache memory), or any suitable combination thereof, during execution thereof by the machine 1200. Accordingly, in various embodiments, the main memory 1232, the static memory 1234, and the processors 1210 are considered machine-readable media 1238.

As used herein, the term "memory" refers to a machine-readable medium 1238 able to store data temporarily or permanently and may be taken to include, but not be limited to, random-access memory (RAM), read-only memory (ROM), buffer memory, flash memory, and cache memory. While the machine-readable medium 1238 is shown, in an example embodiment, to be a single medium, the term "machine-readable medium" should be taken to include a single medium or multiple media (e.g., a centralized or distributed database, or associated caches and servers) able to store the instructions 1216. The term "machine-readable medium" shall also be taken to include any medium, or combination of multiple media, that is capable of storing instructions (e.g., instructions 1216) for execution by a machine (e.g., machine 1200), such that the instructions 1216, when executed by one or more processors of the machine 1200 (e.g., processors 1210), cause the machine 1200 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1250 include a wide variety of components to receive input, provide output, produce output, transmit information, exchange information, capture measurements, and so on. In general, it will be appreciated that the I/O components 1250 can include many other components that are not shown in FIG. 12. Likewise, not all machines will include all I/O components 1250 shown in this exemplary embodiment. The I/O components 1250 are grouped according to functionality merely for simplifying the following discussion, and the grouping is in no way limiting. In various example embodiments, the I/O components 1250 include output components 1252 and input components 1254. The output components 1252 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1254 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1250 include biometric components 1256, motion components 1258, environmental components 1260, position components 1262, among a wide array of other components. For example, the biometric components 1256 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1258 include acceleration sensor components (e.g., accelerometer), gravitation sensor components, rotation sensor components (e.g., gyroscope), and so forth. The environmental components 1260 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1262 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1250 may include communication components 1264 operable to couple the machine 1200 to a network 15 or other device(s) 1270 via a coupling 1282 and a coupling 1272, respectively. For example, the communication components 1264 include a network interface component or another suitable device to interface with the network 1280. In further examples, communication components 1264 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1270 may be another machine 1200 or any of a wide variety of peripheral devices (e.g., a peripheral device coupled via a Universal Serial Bus (USB)).

Moreover, in some embodiments, the communication components 1264 detect identifiers or include components operable to detect identifiers. For example, the communication components 1264 include radio frequency identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1264, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 1280 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1280 or a portion of the network 1280 may include a wireless or cellular network, and the coupling 1280 may be a Code Division Multiple Access (CDMA) connection, a Global System for Mobile communications (GSM) connection, or another type of cellular or wireless coupling. In this example, the coupling 1282 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1216 are transmitted or received over the network 1280 using a transmission medium via a network interface device (e.g., a network interface component included in the communication components 1264) and utilizing any one of a number of well-known transfer protocols (e.g., Hypertext Transfer Protocol (HTTP)). Similarly, in other example embodiments, the instructions 1216 are transmitted or received using a transmission medium via the coupling 1272 (e.g., a peer-to-peer coupling) to the devices 1270. The term "transmission medium" shall be taken to include any intangible medium that is capable of storing, encoding, or carrying the instructions 1216 for execution by the machine 1200, and includes digital or analog communications signals or other intangible media to facilitate communication of such software.

Furthermore, the machine-readable medium 1238 is non-transitory (not having any transitory signals) in that it does not embody a propagating signal. However, labeling the machine-readable medium 1238 "non-transitory" should not be construed to mean that the medium is incapable of movement; the medium 1238 should be considered as being transportable from one physical location to another. Additionally, since the machine-readable medium 1238 is tangible, the medium 1238 may be considered to be a machine-readable device.

In the embodiments described herein, the other devices 1270 may include the mobile device 20, server device 60, and advertiser device 80. The network 1280 may include the network 15.

FIG. 16 is a block diagram 1300 illustrating an exemplary software architecture 1602, which can be employed on any one or more of the machines 1200 described above. FIG. 16 is merely a non-limiting example of a software architecture, and it will be appreciated that many other architectures can be implemented to facilitate the functionality described herein. Other embodiments may include additional elements not shown in FIG. 16 and not all embodiments will include all of the elements of FIG. 16. In various embodiments, the software architecture 1302 is implemented by hardware such as machine 1200 of FIG. 15 that includes processors 1210, memory 1230, and I/O components 1250. In this example architecture, the software architecture 1302 can be conceptualized as a stack of layers where each layer may provide a particular functionality. For example, the software architecture 1302 includes layers such as an operating system 1304, libraries 1306, frameworks 1308, and applications 1310. Operationally, the applications 1310 invoke application programming interface (API) calls 1312 through the software stack and receive messages 1314 in response to the API calls 1312, consistent with some embodiments.

In various implementations, the operating system 1304 manages hardware resources and provides common services. The operating system 1304 includes, for example, a kernel 1320, services 1322, and drivers 1324. The kernel 1320 acts as an abstraction layer between the hardware and the other software layers, consistent with some embodiments. For example, the kernel 1320 provides memory management, processor management (e.g., scheduling), component management, networking, and security settings, among other functionality. The services 1322 can provide other common services for the other software layers. The drivers 1324 are responsible for controlling or interfacing with the underlying hardware, according to some embodiments. For instance, the drivers 1324 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth. In some embodiments, the libraries 1306 provide a low-level common infrastructure utilized by the applications 1310. The libraries 1306 can include system libraries 1330 (e.g., C standard library) that can provide functions such as memory allocation functions, string manipulation functions, mathematic functions, and the like. In addition, the libraries 1306 can include API libraries 1332 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1306 can also include a wide variety of other libraries 1334 to provide many other APIs to the applications 1310.

The frameworks 1308 provide a high-level common infrastructure that can be utilized by the applications 1310, according to some embodiments. For example, the frameworks 1308 provide various graphic user interface (GUI) functions, high-level resource management, high-level location services, and so forth. The frameworks 1308 can provide a broad spectrum of other APIs that can be utilized by the applications 1310, some of which may be specific to a particular operating system 1304 or platform.

According to some embodiments, the applications 1310 are programs that execute functions defined in the programs. Various programming languages can be employed to create one or more of the applications 1310, structured in a variety of manners, such as object-oriented programming languages (e.g., Objective-C, Java, or C++) or procedural programming languages (e.g., C or assembly language). In a specific example, the third-party application 1366 (e.g., an application 1310 developed using the ANDROID™ or IOS™ software development kit (SDK) by an entity other than the vendor of the particular platform) may be mobile software running on a mobile operating system such as IOS™ ANDROID™, WINDOWS® Phone, or another mobile operating system. In this example, the third-party application 1366 can invoke the API calls 1312 provided by the operating system 1304 to facilitate functionality described herein.

FIG. 14 is a graphical illustration 1400 of the mobile device 20, which is an embodiment of the hardware architecture of FIG. 12 and the software architecture of FIG. 13. Most mobile devices 20, modern cellular phones for example, will contain most or all of the element described in FIG. 12.

Referring to FIG. 14, the mobile device 20 includes a controller 1404 communicatively connected to memory 1406, one or more communications interfaces 1408, one or more user interface components 1410, one or more storage devices 1412, and location components 1414 by a bus 1402 or similar mechanism. The controller 1404 may be, for example a microprocessor, digital ASIC, FPGA, or the like. In the embodiment of FIG. 14, the controller 1404 is a microprocessor, and the client module 24, configuration module 26, navigation module 27, live preview module 28, trigger module 39, and notification module 30 are implemented in software and stored in the memory 1406 for execution by the controller 1404. However, the present disclosure is not limited thereto. The aforementioned functions and module may be implemented in software, hardware, or a combination thereof. Further, the offline cache 35 may be stored in the one or more secondary storage components 1412. The communications interface(s) 1408 may be a wireless communication interface that may communicatively connect the mobile device 20 to a network 15. For example, the communications interface 1408 may be a local wireless interface such as a wireless interface operating according to one of the suite of IEEE 802.11 standards, BLUETOOTH®, or the like. However, the present invention is not limited thereto. The one or more user interface components 1410 include, for example, a touchscreen, a display, one or more user input components (e.g., a keypad), a speaker, or the like, or any combination thereof. The storage component(s) 1412 is a non-volatile memory. In this embodiment, the location component 1414 is a hardware component, such as a GPS receiver. However, the present invention is not limited thereto.

FIG. 15 is an exemplary software architecture block diagram 1500 for an exemplary venue operated camera device 40. The venue operated camera device 40 is an instance of the machine of FIG. 12, however in most embodiments the venue operated camera device 40 will be a stripped-down/simplified implementation of the machine 1200. For example, a venue operated camera device 40 may lack many of the sensors and I/O components shown FIG. 12 but will include image capture components 1514.

Referring to FIG. 15, the venue operated camera device 40 includes a controller 1504 communicatively connected to memory 1506, one or more communications interfaces 1508, a location component 1510, one or more storage devices 1512, and capture components 1514 by a bus 1502 or similar mechanism. The controller 1504 may be, for example a microprocessor, digital ASIC, FPGA, or the like. In this embodiment, the controller 1504 is a microprocessor, and the trigger module 43 is implemented in software and stored in the memory 1516 for execution by the controller 1504. However, the present disclosure is not limited thereto. The aforementioned module may be implemented in software, hardware, or a combination thereof. The communications interface(s) 1508 may be a wireless communication interface that may communicatively connect the venue operated camera device 40 to a network 15. For example, the communications interface 1508 may be a local wireless interface such as a wireless interface operating according to one of the suite of IEEE 802.11 standards, BLUETOOTH®, or the like. However, the present invention is not limited thereto. In this embodiment, the location component 1510 is a hardware component, such as a GPS receiver. However, the present invention is not limited thereto. Further, the trigger repository 290 may be stored in the one or more secondary storage components 1512. The secondary storage components 1512 are digital data storage components such as, for example, one or more hard disk drives. However, the present invention is not limited thereto. The capture components 1514 may include the lens, color filter array (CFA), image sensor (e.g. CCD), and analog to digital convertor (ADC) needed to capture an image. However, the present invention is not limited thereto.

FIG. 16 is an exemplary hardware architecture block diagram 1600 for an exemplary server device. The server device 60 is an instance of the machine of FIG. 12, however in most embodiments the server device 60 will be a stripped-down/simplified implementation of the machine 1200. For example, a server device 60 may be a rack mount server and/or a blade server and may lack many of the sensors and I/O components shown FIG. 12. Server devices 60 are often optimized for speed, throughput, power consumption, and reliability.

Referring to FIG. 16, the server device 60 includes a controller 1604 communicatively connected to memory 1606, one or more communications interfaces 1608, and one or more storage devices 1612, and by a bus 1602 or similar mechanism. The controller 1606 may be, for example a microprocessor, digital ASIC, FPGA, or the like. In this embodiment, the controller 1604 is a microprocessor, and the account module 65, imaging engine 66, venue module 67, shotspot module 68, camera module 69, and session module 70 are implemented in software and stored in the memory 1606 for execution by the controller 1604. However, the present disclosure is not limited thereto. The aforementioned module may be implemented in software, hardware, or a combination thereof. The server device 60 also includes a communication interface 1608 enabling the server device 20 to connect to the network 15. For example, the communications interface 1608 may be a wired interface such as an Ethernet interface. However, the present invention is not limited thereto. The account repository 200, imaging repository 220, venue repository 240, shotspot repository 250, camera repository 260 and session repository 270 may be stored in the one or more secondary storage components 1612. The secondary storage components 1612 are digital data storage components such as, for example, one or more hard disk drives. However, the present invention is not limited thereto.

The present disclosure is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Throughout this specification, like reference numbers signify the same elements throughout the description of the figures.

When elements are referred to as being "connected" or "coupled", the elements can be directly connected or coupled together, or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media is non-transitory and includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage components, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

Recitation of ranges of values herein are merely intended to serve as a shorthand method of referring individually to each separate value falling within the range, unless otherwise indicated herein, and each separate value is incorporated into the specification as if it were individually recited herein. Therefore, any given numerical range shall include whole and fractions of numbers within the range. For example, the range "1 to 10" shall be interpreted to specifically include whole numbers between 1 and 10 (e.g., 1, 2, 3, . . . 9) and non-whole numbers (e.g., 1.1, 1.2, . . . 1.9).

Although process (or method) steps may be described or claimed in a particular sequential order, such processes may be configured to work in different orders. In other words, any sequence or order of steps that may be explicitly described or claimed does not necessarily indicate a requirement that the steps be performed in that order unless specifically indicated. Further, some steps may be performed simultaneously despite being described or implied as occurring non-simultaneously (e.g., because one step is described after the other step) unless specifically indicated. Where a process is described in an embodiment the process may operate without any mobile intervention.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

The methodologies presented herein are described around the use of still image capture at venues, but they are not restricted thereto. The same principles may be applied to the capture of video at venues and should be considered within the scope of the present application.

Those skilled in the art will recognize improvements and modifications to the embodiments of the present disclosure. All such improvements and modifications are considered within the scope of the concepts disclosed herein and the claims that follow.

What is claimed is:

1. A server device comprising:
 a network interface operable to:
  couple the server device to a mobile device and a camera device over a network, the camera device being a venue operated camera device operable to capture an image without physical manipulation at the camera device; and
 a processor and memory, associated with the server device, operable to:
  send, to the mobile device, venue information identifying one or more shotspots, ones of the one or more shotspots including a plurality of subspots, each of the plurality of subspots defining a separate location to appear in the image and at which a different a participant is to appear in the image, the image being a single image;
receive, from the mobile device, a designated shotspot of the one or more shotspots;
receive, from the mobile device, trigger information identifying one or more conditions;
determine a trigger status;
send, to the mobile device, the trigger status; and
send, to the mobile device, the image captured based on the trigger information.

2. The server device of claim 1 wherein a venue associated with the camera device is one of more of:
a park,
a business,
a sports venue,
a monument,
a music venue, and
any arbitrary area.

3. The server device of claim 1, wherein to send the venue information, further comprising:
the processor and the memory further operable to:
receive a current location of the mobile device; and
send, based on the current location, the venue information.

4. The server device of claim 1, wherein to send the venue information, further comprising:
the processor and the memory further operable to:
receive a first geographic location, the first geographic location identifying a geographic location of a shotspot associated with the camera device;
receive a second geographic location, the second geographic location identifying a geographic location of the mobile device associated with a user account;
performing a comparison of the first geographic location and the second geographic location; and
based on the comparison, send, to the mobile device, the venue information.

5. The server device of claim 4 wherein the first geographic location and the second geographic location are expressed in GPS coordinates.

6. The server device of claim 4 wherein the comparison is performed to determine if the shotspot and the mobile device associated with the user account are in proximity.

7. The server device of claim 6 wherein the shotspot and the mobile device associated with the user account are in the proximity if a distance between the camera device and the mobile device associated with the user account is less than one of 3 feet, 5 feet, 10 feet, 25 feet, 100 feet, 250 feet, 500 feet, 1000 feet, and one mile.

8. The server device of claim 1 further comprising:
the processor and the memory further operable to:
send, to the mobile device, shotspot information for the designated shotspot identifying:
the plurality of subspots, and
one or more cameras directed to the plurality of subspots.

9. The server device of claim 1 further comprising:
the processor and the memory further operable to:
send a navigation aid, wherein the navigation aid is one or more of:
a map,
an audio clip,
a video clip, and
GPS coordinates.

10. The server device of claim 1 further comprising:
the processor and the memory further operable to:
send a map, wherein the map includes one or more of:
a geographic location of a venue associated with the camera device,
a geographic location of the mobile device,
a geographic location of the camera device, and
a geographic location of the designated shotspot.

11. The server device of claim 1 further comprising:
the processor and the memory further operable to:
send, to the mobile device, a navigational aid enabling a user of the mobile device to arrive at the designated shotspot; and
send, to the mobile device, a sample image taken at the designated shotspot wherein an other user appears in the sample image.

12. The server device of claim 1 further comprising:
the processor and the memory further operable to:
create a session, the session identifying a time period during which the designated shotspot is or was reserved for the mobile device.

13. The server device of claim 12 further comprising:
the processor and the memory further operable to:
group images captured during the session with the session.

14. The server device of claim 12 wherein the session is scheduled in advance of the mobile device arriving at the designated shotspot.

15. The server device of claim 12 wherein the session is scheduled in response to the mobile device arriving at an available designated shotspot.

16. The server device of claim 1 further comprising:
the processor and the memory further operable to:
receive information identifying a subject face of a user associated with the mobile device.

17. The server device of claim 16 further comprising:
the processor and the memory further operable to:
link existing images in which the subject face appears with a user account associated with the user of the mobile device.

18. The server device of claim 16 further comprising:
the processor and the memory further operable to:
link existing sessions in which the user corresponding to the subject face participated.

19. The server device of claim 16 further comprising:
the processor and the memory further operable to:
configure all camera devices to auto-capture images in which the subject face appears; and
send, to the mobile device associated with the user associated with the user, the auto-captured images.

20. The server device of claim 1 wherein the trigger information directs the camera device to capture the image:
based on scenes received at the camera device,
immediately upon receipt of the trigger information,
after a timer countdown,
based upon a hand gesture of a user,
based on audio information,
based on a presence of one or more users based on a detection of one or more subject faces,
based on the presence of one or more users based on tracking information, and
based on all users expressing a same emotion.

21. The server device of claim 1, in determining the trigger status, further comprising:
the processor and the memory further operable to:

receive, from each of one or more camera devices associated with the designated shotspot, the trigger status identifying a status of each condition associated with a trigger; and route, to one or more devices associated with the plurality of subspots associated with the designated shotspot, a corresponding trigger status for one subspot of the plurality of subspots.

22. The server device of claim 1, in sending the trigger status, further comprising:

the processor and the memory further operable to:

send preview information.

23. The server device of claim 22 wherein the preview information is one or more of:

a video-feed from the camera device, an image-feed from the camera device, and an image from the camera device.

24. The server device of claim 1 wherein the image is one or more of:

a thumbnail image, a watermarked image, a RAW image, an encoded image, and a URL for the image.

25. The server device of claim 1 wherein the image is stored at the server device.

26. The server device of claim 1 wherein the mobile device is one of:

a mobile phone, a tablet, and a portable computer.

27. The server device of claim 1 wherein the camera device is one of:

mounted on a pole, hung from a wire, mounted in ground, mounted at ground level, and mounted on a building.

28. The server device of claim 1 wherein the camera device is associated with a moveable venue, the one or more shotspots are stationary in reference to the moveable venue, geographic coordinates of the one or more shotspots, subspots, and venue operated cameras are expressed relative to a geographical position of the moveable venue.

29. The server device of claim 28 wherein the moveable venue is one of:

an automobile, a cruise ship, and an airplane.

30. The server device of claim 1 further comprising:

the processor and the memory further operable to:

receive, from the mobile device, tracking information, the mobile device associated with a user account, the user account associated with a user of the mobile device;

determine, based on the tracking information, that the mobile device is at the designated shotspot; and send, based on the determination, a command to the camera device to capture the image of the user associated with the mobile device.

31. The server device of claim 1 further comprising:

the processor and the memory further operable to:

receive, from the mobile device, subject face information identifying a user associated with a user account, the user account associated with the mobile device;

send, to the camera device, the subject face information; and receive, from the camera device, the image captured by the camera device wherein a subject face identified by the subject face information appears.

32. The server device of claim 1 wherein the camera device is one of a plurality of camera devices associated with the designated shotspot.

33. A method of operating a server device comprising:

sending to a mobile device, venue information identifying one or more shotspots, ones of the one or more shotspots including a plurality of subspots, each of the plurality of subspots defining a separate location to appear in an image and at which a different participant is to appear in the image;

receiving, from the mobile device, a designated shotspot of the one or more shotspots;

receiving, from a camera device associated with the designated shotspot, the image, the camera device being a venue operated camera device operable to capture the image without physical manipulation at the camera device, the image being a single image; and sending, to the mobile device, the image.

34. A non-transitory computer readable medium storing machine codes that when executed by a processor of a server device render the server device operable to:

send to a mobile device, venue information identifying one or more shotspots, ones of the one or more shotspots including a plurality of subspots, each of the plurality of subspots defining a separate location to appear in an image and at which a different participant is to appear in the image;

receive, from the mobile device, a designated shotspot of the one or more shotspots;

receive, from a camera device associated with the designated shotspot, the camera device being a venue operated camera device operable to capture the image without physical manipulation at the camera device, the image being a single image; and send, to the mobile device, the image.

* * * * *

UNITED STATES PATENT AND TRADEMARK OFFICE
CERTIFICATE OF CORRECTION

Page 1 of 1

PATENT NO. : 11,064,102 B1
APPLICATION NO. : 16/248930
DATED : July 13, 2021
INVENTOR(S) : Mike Helpingstine and Hugh Blake Svendsen It is certified that error appears in the above-identified patent and that said Letters Patent is hereby corrected as shown below:

In the Claims

Claim 34 Should read:
34. A non-transitory computer readable medium storing machine codes that when executed by a processor of a server device render the server device operable to:
    send to a mobile device, venue information identifying one or more shotspots, ones of the one or more shotspots including a plurality of subspots, each of the plurality of subspots defining a separate location to appear in an image and at which a different participant is to appear in the image;
    receive, from the mobile device, a designated shotspot of the one or more shotspots;
    receive, from a camera device associated with the designated shotspot, the image, the camera device being a venue operated camera device operable to capture the image without physical manipulation at the camera device, the image being a single image; and
    send, to the mobile device, the image.

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*